United States Patent
Fujii

(10) Patent No.: US 10,498,709 B2
(45) Date of Patent: Dec. 3, 2019

(54) INFORMATION PROCESSING SYSTEM, COMMUNICATION RELAY DEVICE, LICENSE SERVER, PROGRAM, AND DATA RECOVERY METHOD

(71) Applicant: Konica Minolta, Inc., Chiyoda-ku, Tokyo (JP)

(72) Inventor: Masato Fujii, Nagaokakyo (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 396 days.

(21) Appl. No.: 15/382,049

(22) Filed: Dec. 16, 2016

(65) Prior Publication Data

US 2017/0230346 A1 Aug. 10, 2017

(30) Foreign Application Priority Data

Feb. 8, 2016 (JP) .................................. 2016-021692

(51) Int. Cl.
*H04L 9/32* (2006.01)
*H04L 29/06* (2006.01)
(Continued)

(52) U.S. Cl.
CPC .......... *H04L 63/0492* (2013.01); *G06F 11/00* (2013.01); *H04L 63/0428* (2013.01); *H04L 63/061* (2013.01); *H04L 63/064* (2013.01); *H04L 65/1063* (2013.01); *H04L 67/10* (2013.01); *H04L 67/28* (2013.01); *H04L 69/40* (2013.01); *H04L 2463/062* (2013.01)

(58) Field of Classification Search
CPC ............. H04L 63/0492; H04L 63/0428; H04L 63/061; H04L 63/064; H04L 67/10; H04L 67/28; H04L 67/40; G06F 11/00
USPC ......................................................... 713/171
See application file for complete search history.

(56) References Cited

U.S. PATENT DOCUMENTS

| | | | |
|---|---|---|---|
| 2002/0169002 A1* | 11/2002 | Imbrie | G06F 21/608 455/557 |
| 2003/0093439 A1* | 5/2003 | Mogi | G06F 16/22 |

(Continued)

FOREIGN PATENT DOCUMENTS

JP 2008-236092 A 10/2008

*Primary Examiner* — Samson B Lemma
(74) *Attorney, Agent, or Firm* — Buchanan Ingersoll & Rooney PC

(57) ABSTRACT

A communication relay device that relays communication performed between an image processing device and an application server via a network includes: an exchange key generating unit that generates an exchange key, and transmits the exchange key to the image processing device and a license server; a relay information generating unit that generates relay information used for relaying the communication; a storage unit that stores the relay information; a communication relay unit that relays the communication; a backup unit that transmits the relay information to a backup server connected to the network; an exchange key authenticating unit that determines whether or not an exchange sequence start condition is satisfied, and, when satisfied, acquires the exchange key and transmits the exchange key to the license server; and a setting reflecting unit that acquires the relay information from the backup server, and stores the relay information in the storage unit.

27 Claims, 10 Drawing Sheets

(51) Int. Cl.
    *H04L 29/08*     (2006.01)
    *G06F 11/00*     (2006.01)
    *H04L 29/14*     (2006.01)

(56) References Cited

U.S. PATENT DOCUMENTS

| | | | |
|---|---|---|---|
| 2006/0133605 A1* | 6/2006 | Funahashi | G06F 21/32 380/30 |
| 2011/0093715 A1* | 4/2011 | Kanee | G11B 20/00086 713/176 |
| 2016/0087946 A1* | 3/2016 | Yang | G06F 21/62 713/171 |

* cited by examiner

| No. | RELAY TARGET DEVICE | IP ADDRESS | MAC ADDRESS |
|---|---|---|---|
| 1 | MFP1 | 192.128.10.3 | 04-20-0A-10-0A-A1 |
| 2 | MFP2 | 192.128.10.5 | 03-25-2C-41-19-A3 |

| No. | SERVER SIDE CONNECTION INFORMATION | | LAN SIDE CONNECTION INFORMATION |
|---|---|---|---|
| | URL | PORT | PORT |
| 1 | http://server01/application1/··· | 10080 | 250 |
| 2 | http://server02/application2/··· | 18080 | 120 |

| No. | IDENTIFICATION INFORMATION | EXCHANGE KEY |
|---|---|---|
| 1 | 10012345 | 100265415284 |
| 2 | 21005648 | 356910846441 |

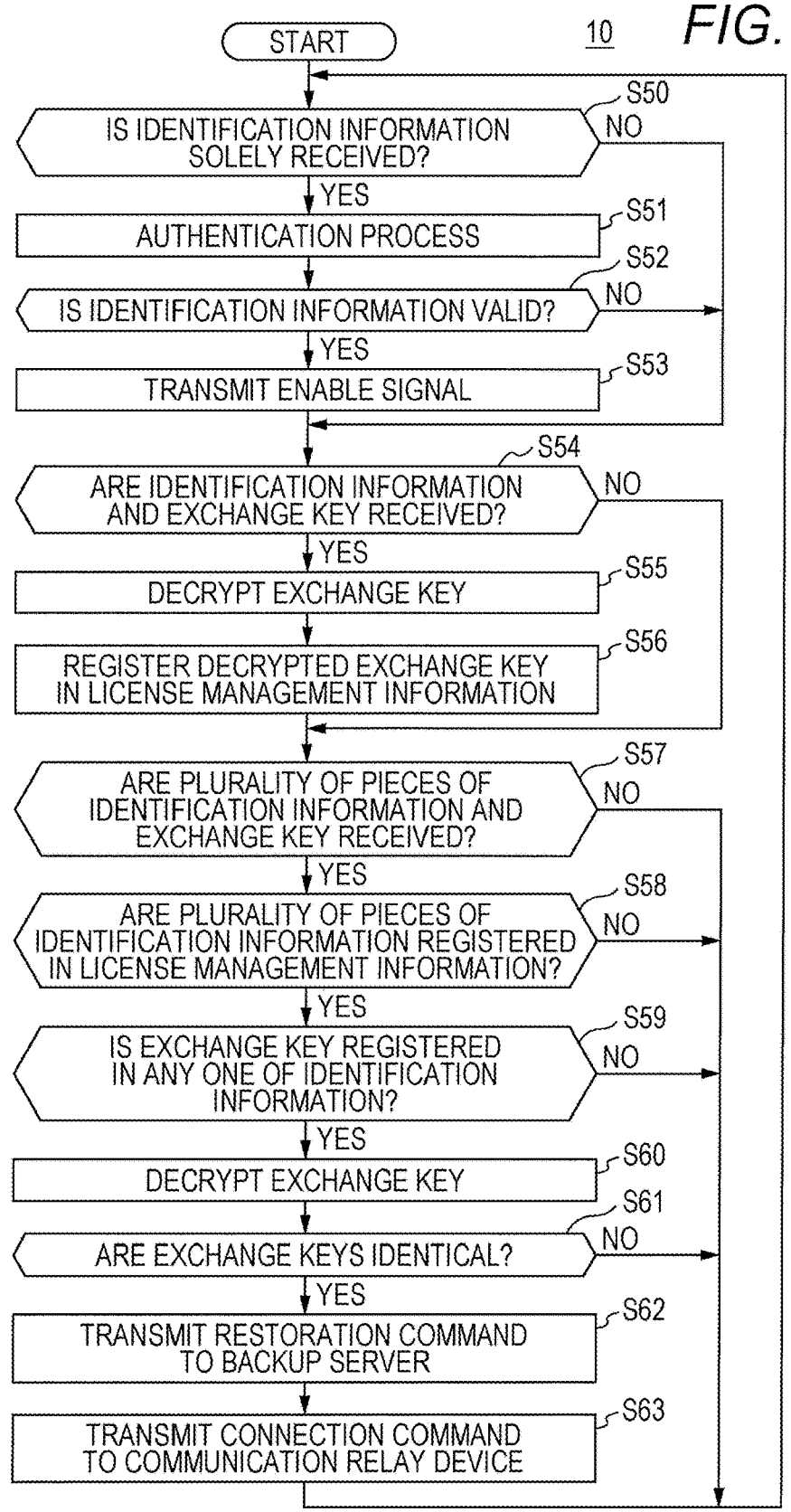

INFORMATION PROCESSING SYSTEM, COMMUNICATION RELAY DEVICE, LICENSE SERVER, PROGRAM, AND DATA RECOVERY METHOD

The entire disclosure of Japanese Patent Application No. 2016-021692 filed on Feb. 8, 2016 including description, claims, drawings, and abstract are incorporated herein by reference in its entirety.

BACKGROUND OF THE INVENTION

Field of the Invention

The present invention relates to an information processing system, a communication relay device, a license server, a program, and a data recovery method, and more particularly, to a data recovery technique when a communication relay device that relays communication between an application server an image processing device is exchanged.

Description of the Related Art

In the past, a technique of recovering data that is encrypted and stored in a storage device in a device even when an encryption key in a device is unusable has been proposed (for example, JP 2008-236092 A). In this related art, an encryption key is printed on a sheet of paper in advance before a controller board has a failure. Then, when the controller board is exchanged due to a failure, the user inputs the encryption key printed on a sheet of paper in advance through an operation panel. As a result, an encryption key is restored in the exchanged controller board. Thus, the exchanged controller board can decrypt encrypted data in the storage device using the restored encryption key and recover data.

Meanwhile, in recent years, application servers are installed in the cloud on the Internet to provide various application services (cloud services). Since the application services can be used anytime anywhere, convenience of the user is high. Further, with the spread of application services, a technique capable of executing a job in collaboration with an application server even in an image processing device such as multifunction peripherals (MFP) installed in an office or the like has been spread. For example, an image processing device can access an application server to download and acquire data such as a document or an image stored in the application server and executes a print job or uploads image data generated by a scan job to the application server.

Further, the application server can also transmit a print job to the image processing device. However, since the image processing device is installed in a local network in which an access from the Internet is blocked by a firewall, when the application server transmits data such as a print job to the image processing device, a communication relay device that relays communication between the application server and the image processing device in the local network is necessary. The communication relay device is a device that relays the application server on the cloud and the image processing device in the local network and transfers data transmitted from the application server to the image processing device or transfers data transmitted from the image processing device to the application server. Thus, when the communication relay device is installed in the local network, the application server can pass through the firewall and transmit data to the image processing device in the local network, the application server and the image processing device can perform a collaboration operation while performing communication in both directions.

The communication relay device generates and holds relay information for relaying the communication between the application server and the image processing device. For example, information for performing communication with the application server via the Internet and information for performing communication with the image processing device via the local network are recorded in the relay information. Further, when data designating the image processing device as a transmission destination is received from the application server, the communication relay device specifies a port number or the like based on the relay information which is generated in advance and transfers data to the image processing device. Further, even when data designating the application server as a transmission destination is received from the image processing device, the communication relay device similarly specifies a uniform resource locator (URL), a port number, or the like based on the relay information and transfers data to the application server.

As described above, in the system in which the communication relay device relays the communication between the application server and the image processing device, when the communication relay device does not operate due to a failure, the communication relay device is exchanged with a new communication relay device. In this case, since the relay information is not stored in the new communication relay device, it is necessary to generate the relay information again. Meanwhile, since it takes time and effort to newly register information for performing communication with the application server or the like in the exchanged communication relay device, it is difficult to recover the communication relay function rapidly. For this reason, it is desired to cause the relay information held in the communication relay device before the exchange to migrate to the exchanged communication relay device.

However, when the data recovery method disclosed in JP 2008-236092 A is employed, it is necessary for the user to print the relay information held in the communication relay device in advance in a state in which the communication relay device is normally operated. For this reason, when the user does not print and output the relay information in advance, there is a problem in that it is unable to perform the data recovery rapidly on the communication relay device that is exchanged and newly installed.

SUMMARY OF THE INVENTION

In this regard, the present invention has been made to solve the above problem, and it is an object of the present invention to provide an information processing system, a communication relay device, a license server, a program, and a data recovery method, which are capable of recovering data such as the relay information rapidly when the communication relay device is exchanged.

To achieve the abovementioned object, according to an aspect, a communication relay device that relays communication performed between an image processing device and an application server via a network, reflecting one aspect of the present invention comprises: an exchange key generating unit that generates an exchange key, and transmits the exchange key to the image processing device and a license server connected to the network; a relay information generating unit that generates relay information used for relaying the communication between the image processing device and the application server; a storage unit that stores the relay information generated by the relay information generating unit; a communication relay unit that relays the communication between the image processing device and the application server based on the relay information stored in the storage unit; a backup unit that transmits the relay information stored in the storage unit to a backup server connected to the network at a predetermined timing; an exchange key authenticating unit that determines whether or not an exchange sequence start condition is satisfied, and, when the exchange sequence start condition is satisfied, acquires the exchange key from the image processing device and transmits the exchange key to the license server; and a setting reflecting unit that, after the exchange key authenticating unit transmits the exchange key, acquires the relay information from the backup server based on an instruction given from the license server, and stores the relay information in the storage unit.

According to an invention of Item. 2, in the communication relay device of Item. 1, when a plurality of image processing devices are connected to the network, the exchange key generating unit preferably selects at least one image processing device among the plurality of image processing devices, and transmits the exchange key to the at least one image processing device.

According to an invention of Item. 3, in the communication relay device of Item. 2, the exchange key generating unit preferably analyzes operation rates of the plurality of image processing devices, and selects the at least one image processing device as a transmission target of the exchange key in descending order of the operation rates.

According to an invention of Item. 4, in the communication relay device of Item. 1, when the exchange key is transmitted to the image processing device and the license server, the exchange key generating unit preferably encrypts the exchange key using a predetermined encryption key, and transmits the encrypted exchange key.

According to an invention of Item. 5, in the communication relay device of Item. 1, the communication relay device preferably further comprises a recording medium mounting unit in which a plurality of recording media are mountable, wherein, when one recording medium is mounted in the recording medium mounting unit, the exchange key generating unit preferably generates the exchange key, and transmits identification information recorded in the one recording medium to the license server together with the exchange key.

According to an invention of Item. 6, in the communication relay device of Item. 5, when a plurality of recording media are mounted in the recording medium mounting unit, the exchange key authenticating unit preferably determines the exchange sequence start condition to be satisfied, acquires the exchange key from the image processing device, reads a plurality of pieces of identification information from the plurality of recording media mounted in the recording medium mounting unit, and transmits the exchange key acquired from the image processing device and the plurality of pieces of identification information read from the plurality of recording media to the license server.

According to an invention of Item. 7, in the communication relay device of Item. 6, when the exchange key is transmitted to the image processing device and the license server, the exchange key generating unit preferably encrypts the exchange key using an encryption key corresponding to the identification information read from the one recording medium, and transmits the encrypted exchange key.

According to an invention of Item. 8, in the communication relay device of Item. 1, the exchange key generating unit preferably updates the exchange key at a predetermined timing, and transmits the updated exchange key to the image processing device and the license server each time the exchange key is updated.

According to an invention of Item. 9, in the communication relay device of Item. 8, the backup unit preferably transmits the relay information to the backup server at a timing at which the relay information is updated by the relay information generating unit, and the exchange key generating unit preferably updates the exchange key at a timing at which the relay information is transmitted to the backup server.

To achieve the abovementioned object, according to an aspect, an information processing system reflecting one aspect of the present invention comprises: the communication relay device of Item. 1; an image processing device connected to a network; an application server that provides an application service in collaboration with the image processing device via the network; a license server that is connected to the network and manages the communication relay device; and a backup server that stores information received via the network as backup, wherein the communication relay device is a communication relay device that relays communication between the image processing device and the application server via the network, and the license server includes a license management unit that registers the exchange key transmitted from the communication relay device in license management information, and manages the exchange key, a determining unit that determines that the communication relay device is exchanged if the exchange key is already registered in the license management information when the exchange key is received from the communication relay device, and a relay information restoring unit that causes the communication relay device to acquire the relay information stored in the backup server and store the relay information in the storage unit when the determining unit determines that the communication relay device is exchanged.

According to an invention of Item. 11, in the information processing system of Item. 10, when a plurality of image processing devices are connected to the network, the exchange key generating unit preferably selects at least one image processing device among the plurality of image processing devices, and transmits the exchange key to the at least one image processing device.

According to an invention of Item. 12, in the information processing system of Item. 11, the exchange key generating unit preferably analyzes operation rates of the plurality of image processing devices, and selects the at least one image processing device as a transmission target of the exchange key in descending order of the operation rates.

According to an invention of Item. 13, in the information processing system of Item. 10, when the exchange key is transmitted to the image processing device and the license server, the exchange key generating unit preferably encrypts the exchange key using a predetermined encryption key, and transmits the encrypted exchange key, and when the encrypted exchange key is received from the communication relay device, the license server preferably decrypts the exchange key using a decryption key constituting a pair with the encryption key.

According to an invention of Item. 14, in the information processing system of Item. 10, the communication relay device preferably further includes a recording medium mounting unit in which a plurality of recording media are mountable, when one recording medium is mounted in the recording medium mounting unit, the exchange key generating unit preferably generates the exchange key, and transmits identification information recorded in the one recording medium to the license server together with the exchange key, and the license management unit preferably registers the exchange key and the identification information transmitted from the communication relay device in the license management information to be associated with each other, and manages the exchange key and the identification information.

According to an invention of Item. 15, in the information processing system of Item. 14, when a plurality of recording media are mounted in the recording medium mounting unit, the exchange key authenticating unit preferably determines the exchange sequence start condition to be satisfied, acquires the exchange key from the image processing device, reads a plurality of pieces of identification information from the plurality of recording media mounted in the recording medium mounting unit, and transmits the exchange key acquired from the image processing device and the plurality of pieces of identification information read from the plurality of recording media to the license server, and when the exchange key and the plurality of pieces of identification information are received from the communication relay device, the determining unit preferably determines that the communication relay device is exchanged when the exchange key and the plurality of pieces of identification information are already registered in the license management information in a state in which the exchange key received from the communication relay device is associated with any one of the plurality of pieces of identification information.

According to an invention of Item. 16, in the information processing system of Item. 15, when the exchange key is transmitted to the image processing device and the license server, the exchange key generating unit preferably encrypts the exchange key using an encryption key corresponding to the identification information read from the one recording medium, and transmits the encrypted exchange key, and when the exchange key and the plurality of pieces of identification information are received from the communication relay device, if the exchange key and the plurality of pieces of identification information are already registered in the license management information in a state in which the exchange key received from the communication relay device is associated with any one of the plurality of pieces of identification information, the determining unit preferably decrypts the exchange key received from the communication relay device using a decryption key corresponding to the one piece of identification information, and determines whether or not the decrypted exchange key is identical to the exchange key registered in the license management information to be associated with the one piece of identification information.

According to an invention of Item. 17, in the information processing system of Item. 10, the exchange key generating unit preferably updates the exchange key at a predetermined timing, and transmits the updated exchange key to the image processing device and the license server each time the exchange key is updated.

According to an invention of Item. 18, in the information processing system of Item. 17, the backup unit preferably transmits the relay information to the backup server at a timing at which the relay information is updated by the relay information generating unit, and the exchange key generating unit preferably updates the exchange key at a timing at which the relay information is transmitted to the backup server.

To achieve the abovementioned object, according to an aspect, a license server that manages a communication relay device in an information processing system including an image processing device connected to a network, an application server that provides an application service in collaboration with the image processing device via the network, the communication relay device that relays communication between the image processing device and the application server via the network, and a backup server that stores relay information transmitted from the communication relay device via the network as backup, reflecting one aspect of the present invention comprises: a license management unit that registers the exchange key transmitted from the communication relay device in license management information, and manages the exchange key; a determining unit that determines that the communication relay device is exchanged if the exchange key is already registered in the license management information when the exchange key is received from the communication relay device; and a relay information restoring unit that causes the communication relay device to acquire the relay information stored in the backup server and restore the relay information in the communication relay device when the determining unit determines that the communication relay device is exchanged.

According to an invention of Item. 20, in the license server of Item. 19, when the exchange key encrypted using a predetermined encryption key is received from the communication relay device, the exchange key is preferably decrypted using a decryption key constituting a pair with the encryption key.

According to an invention of Item. 21, in the license server of Item. 19, when one piece of identification information is received from the communication relay device together with the exchange key, the license management unit preferably registers the exchange key and the one piece of identification information in the license management information to be associated with each other, and manages the exchange key and the one piece of identification information.

According to an invention of Item. 22, in the license server of Item. 21, when the exchange key and a plurality of pieces of identification information are received from the communication relay device, the determining unit preferably determines that the communication relay device is exchanged when the exchange key and the plurality of pieces of identification information are already registered in the license management information in a state in which the exchange key received from the communication relay device is associated with any one of the plurality of pieces of identification information.

According to an invention of Item. 23, in the license server of Item. 22, when the encrypted exchange key and the plurality of pieces of identification information are received from the communication relay device, if the exchange key and the plurality of pieces of identification information are already registered in the license management information in a state in which the exchange key received from the communication relay device is associated with any one of the plurality of pieces of identification information, the determining unit preferably decrypts the exchange key received from the communication relay device using a decryption key corresponding to the one piece of identification information, and determines whether or not the decrypted exchange key is identical to the exchange key registered in the license management information to be associated with the one piece of identification information.

To achieve the abovementioned object, according to an aspect, there is provided a non-transitory recording medium storing a computer readable program executed in a communication relay device that relays communication between an image processing device and an application server via a network, and the program reflecting one aspect of the present invention causes the communication relay device to execute: a first step of generating an exchange key and transmitting the exchange key to the image processing device and a license server connected to the network; a second step of generating relay information used for relaying communication between the image processing device and the application server; a third step of storing the relay information generated in the second step in a predetermined storage unit; a fourth step of relaying the communication between the image processing device and the application server based on the relay information stored in the storage unit; a fifth step of transmitting the relay information stored in the storage unit to a backup server connected to the network at a predetermined timing; a sixth step of determining whether or not an exchange sequence start condition is satisfied, and acquiring the exchange key from the image processing device and transmitting the exchange key to the license server when the exchange sequence start condition is satisfied; and a seventh step of acquiring, after the exchange key is transmitted in the sixth step, the relay information from the backup server based on an instruction given from the license server and storing the relay information in the storage unit.

To achieve the abovementioned object, according to an aspect, there is provided a non-transitory recording medium storing a computer readable program executed in a license server that manages a communication relay device in an information processing system including an image processing device connected to a network, an application server that provides an application service in collaboration with the image processing device via the network, the communication relay device that relays communication between the image processing device and the application server via the network, and a backup server that stores relay information transmitted from the communication relay device via the network as backup, and the program reflecting one aspect of the present invention causes the license server to execute: a first step of registering an exchange key transmitted from the communication relay device in license management information and managing the exchange key; a second step of determining that the communication relay device is exchanged if the exchange key is already registered in the license management information when the exchange key is received from the communication relay device; and a third step of causing the communication relay device to acquire the relay information stored in the backup server and restore the relay information in the communication relay device when the communication relay device is determined to be exchanged in the second step.

To achieve the abovementioned object, according to an aspect, a data recovery method when a communication relay device is exchanged in an information processing system including an image processing device connected to a network, an application server that provides an application service in collaboration with the image processing device via the network, the communication relay device that relays communication between the image processing device and the application server via the network, a license server that is connected to the network and manages the communication relay device, and a backup server that stores information received via the network as backup, reflecting one aspect of the present invention comprises: a first step of generating, by the communication relay device, an exchange key and transmitting the exchange key to the image processing device and the license server; a second step of registering, by the license server, the exchange key transmitted from the communication relay device in license management information, and managing the exchange key; a third step of generating, by the communication relay device, relay information used for relaying the communication between the image processing device and the application server; a fourth step of storing, by the communication relay device, to store the relay information in a predetermined storage unit; a fifth step of relaying, by the communication relay device, the communication between the image processing device and the application server based on the relay information stored in the storage unit; a sixth step of transmitting, by the communication relay device, the relay information stored in the storage unit to the backup server at a predetermined timing; a seventh step of determining whether or not an exchange sequence start condition is satisfied in the communication relay device after the communication relay device is exchanged, and acquiring, by the communication relay device, the exchange key from the image processing device and transmitting the exchange key to the license server when the exchange sequence start condition is satisfied; an eighth step of determining, by the license server, that the communication relay device is exchanged if the exchange key is already registered in the license management information when the exchange key is received from the communication relay device; a ninth step of causing, by the license server, the communication relay device to acquire the relay information stored in the backup server when the communication relay device is determined to be exchanged in the eighth step; and a tenth step of acquiring, by the communication relay device, the relay information from the backup server based on an instruction given from the license server and storing the relay information in the storage unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a diagram illustrating an example of management information;

FIG. 6 is a diagram illustrating an example of relay information;

FIG. 12 is a flowchart illustrating an example of a process performed in a license server.

DESCRIPTION OF THE PREFERRED EMBODIMENTS

Figure 1:
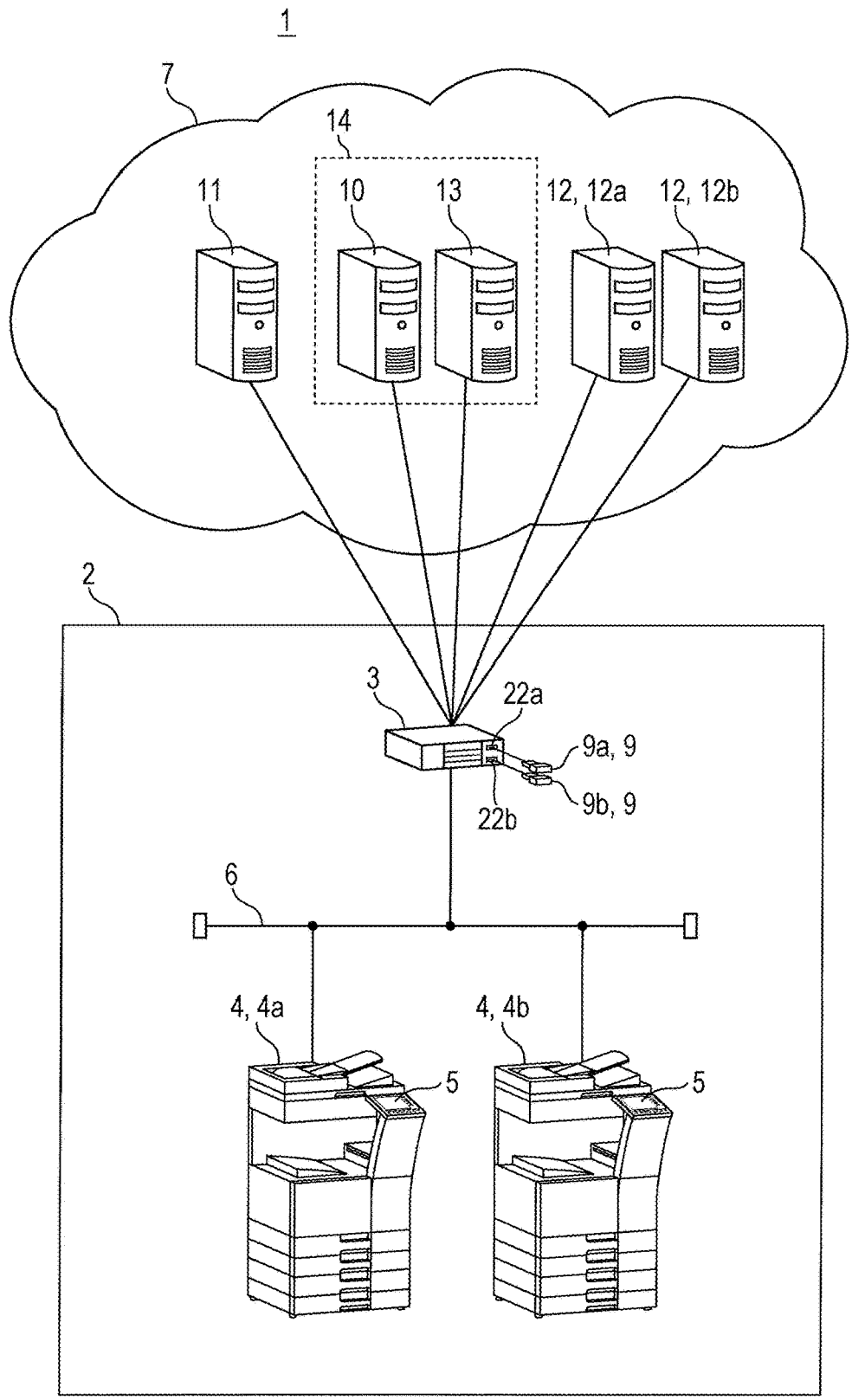
FIG. 1 is a diagram illustrating a configuration concept of an information processing system.

Hereinafter, preferred embodiments of the present invention will be described in detail with reference to the drawings. However, the scope of the invention is not limited to the illustrated examples. In the following embodiments, parts which are common to each other are denoted by the same reference numerals, and a repeated description will be omitted.

FIG. 1 is a diagram illustrating a configuration concept of an information processing system 1 according to an embodiment of the present invention. The information processing system 1 includes a communication relay device 3, an image processing device 4, a license server 10, a backup server 11, an application server 12, and a platform server 13. The communication relay device 3 and the image processing device 4 are installed in a local environment 2 such as an office and connected to a local network 6 such as a local area network (LAN). The license server 10, the backup server 11, the application server 12, and the platform server 13 are installed in the cloud 7 on the Internet. FIG. 1 illustrates an example in which two image processing devices 4a and 4b are connected to the local network 6, but the number of image processing devices 4 is not limited thereto. FIG. 1 illustrates an example in which two application servers 12a and 12b are installed in the cloud 7, but the number of application servers 12 is not limited thereto. A plurality of communication relay devices 3 may be installed in the local environment 2. Further, although not illustrated, a firewall is installed in a connection portion of the local network 6 which is connected to the Internet.

The application server 12 is a server that provides various application services (cloud services) via the Internet. Examples of the service provided by the application server 12 include a storage service of storing uploaded data and an information processing service of performing various kinds of information processes such as edition, processing, conversion, and the like of uploaded data. For example, the two application servers 12a and 12b illustrated in FIG. 1 provide different application services.

The image processing device 4 is configured with, for example, an MFP having a copy function, a print function, a scan function, and the like and capable of executing a copy job, a print job, a scan job, and the like. The image processing device 4 includes an operation panel 5 serving as a user interface by which the user performs an operation. Thus, the user can designate a type of job and cause the image processing device 4 to perform the job by operating the operation panel 5. The image processing device 4 can perform communication with the application server 12 of the cloud 7 and perform a job in collaboration with the application server 12. The image processing device 4 may further have a facsimile (FAX) function of transmitting and receiving FAX data.

The communication relay device 3 relays communication between the image processing device 4 connected to the local network 6 and the application server 12 installed in the cloud 7. For example, at the time of activation with the supply of electric power, the communication relay device 3 performs communication with the license server 10 and undergoes authentication by the license server 10. Then, when an enable signal indicating that a license is valid is received from the license server 10, the communication relay device 3 enables a communication relay function and relays communication between the image processing device 4 and the application server 12.

The license server 10 is a server that authenticates the license of the communication relay device 3 installed in the local environment 2. The license server 10 determines whether or not the license of the communication relay device 3 is valid based on information received from the communication relay device 3, and controls the communication relay device 3 based on a determination result. For example, when the license is valid, the license server 10 transmits the enable signal to the communication relay device 3.

The backup server 11 is a server that stores various information received via the Internet as backup. The backup server 11 is configured to store and hold information transmitted from the communication relay device 3 of the local environment 2.

The platform server 13 is a connection relay server that causes the communication relay device 3 to establish a connection state with the application server 12 when the application server 12 starts communication with the image processing device 4 in the local environment 2. In the present embodiment, an example in which the platform server 13 and the license server 10 are configured as different servers. However, the present invention is not limited thereto, and the license server 10 and the platform server 13 may be configured as one server device 14.

The communication relay device 3 includes a plurality of slots 22a and 22b for mounting a plurality of recording media 9 (9a and 9b) such as USB memories as illustrated in FIG. 1. The recording medium 9 stores identification information such as a serial number of the communication relay device 3. At the time of shipment of the communication relay device 3, the communication relay device 3 is shipped in a state in which one recording medium 9 having the identification information of the communication relay device 3 recorded therein is mounted in one slot 22a (or 22b) among a plurality of slots 22a and 22b. When one recording medium 9 is mounted in one slot 22a among a plurality of slots 22a and 22b, the communication relay device 3 reads the identification information recorded in one recording medium 9, transmits the identification information to the license server 10, and undergoes authentication by the license server 10. Then, upon receiving the enable signal from the license server 10, the communication relay device 3 starts an operation of relaying the communication between the image processing device 4 and the application server 12.

Further, when the communication relay device 3 is exchanged due to a failure or the like, the recording medium 9a mounted in the communication relay device 3 before the exchange is removed, and the removed recording medium 9a is mounted in a communication relay device 3 that is newly installed by the exchange. Therefore, when the communication relay device 3 is exchanged, a plurality of recording media 9a and 9b are simultaneously mounted into a plurality of slots 22a and 22b of the communication relay device 3 that is newly installed by the exchange.

When the communication relay device 3 is connected to the local network 6 and activated, the communication relay device 3 regularly searches for the image processing device 4 connected to the local network 6, and specifies a relay target device whose communication with the application server 12 is to be relayed by the communication relay device 3. For example, when a plurality of communication relay devices 3 are installed in the local network 6, in order to search for the image processing device 4, the communication relay device 3 performs communication with another communication relay device 3, extracts only the image processing device 4 to be relayed by the communication relay device 3 excluding the image processing devices 4 already managed as the relay target device by the other communication relay devices 3, and specifies the extracted image processing device 4 as the relay target device. When the relay target device is specified, the communication relay device 3 notifies the platform server 13 of information related to the relay target device. Then, when the communication relay function is effectively operated, the communication relay device 3 relays communication between the image processing device 4 specified as the relay target device and the application server 12.

Further, when the communication relay device 3 initially relays the communication between the image processing device 4 and the application server 12, the communication relay device 3 generates relay information for relaying the communication between the application server and the image processing device. The relay information is information in which information for performing communication with the application server 12 via the Internet and information for performing communication with the image processing device 4 via the local network 6 are recorded. The communication relay device 3 is configured to hold the relay information and perform data transfer based on the relay information that is generated in advance when the communication between the image processing device 4 and the application server 12 is relayed later.

The communication relay device 3 transmits the relay information to the backup server 11 at a predetermined timing. The backup server 11 is configured to hold the relay information when the relay information is acquired from the communication relay device 3.

Figure 2:
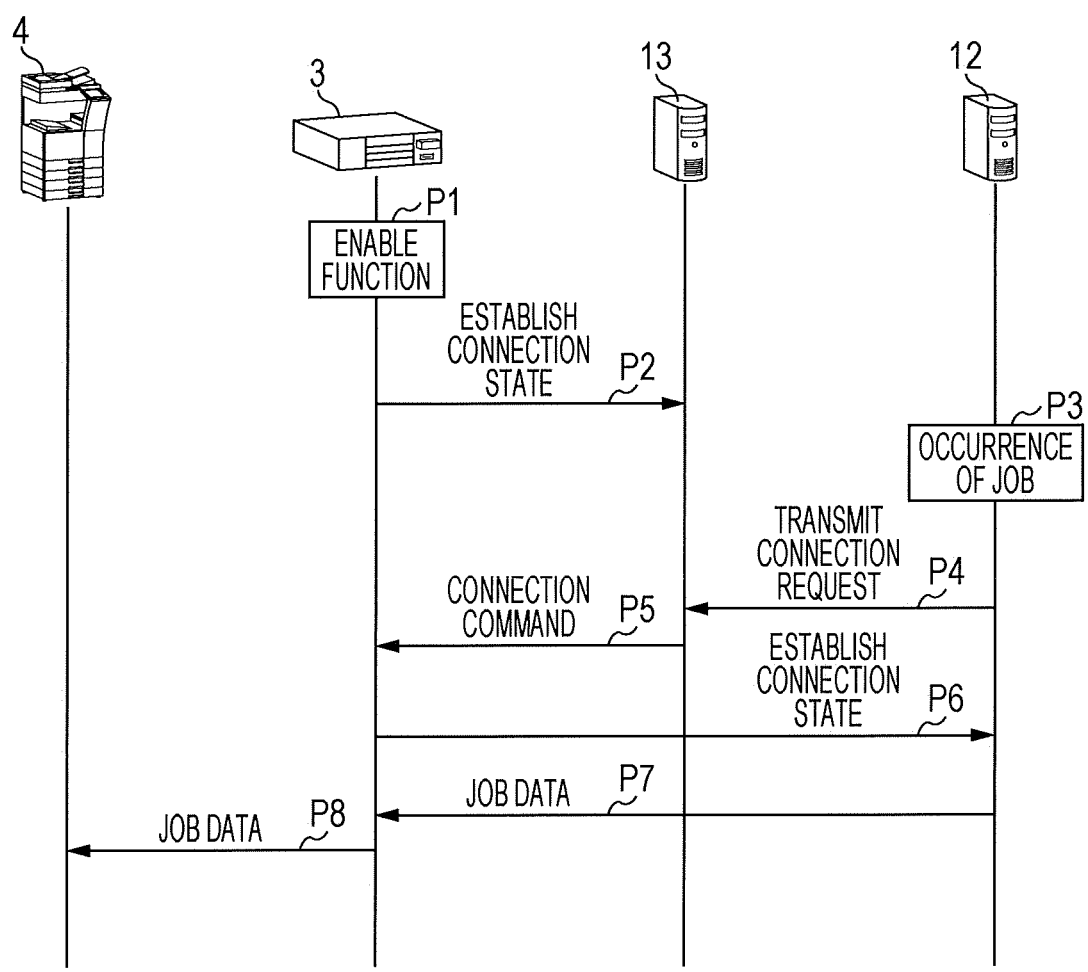
FIG. 2 is a diagram illustrating a first communication process performed such that a communication relay device relays communication between an image processing device and an application server.

FIG. 2 is a diagram illustrating a first communication process performed such that the communication relay device 3 relays the communication between the image processing device 4 and the application server 12. The first communication process is a common communication process when the exchange of the communication relay device 3 is excluded and an example in which job data is transmitted from the application server 12 to the image processing device 4 is described. For example, the user is assumed to activate a browser in an information processing terminal such as a personal computer (PC) or a tablet terminal and access the application server 12. In this case, by performing an operation on a browsing screen of the application server 12 displayed on the browser, the user can designate the image processing device 4 installed in the local environment 2 and give an instruction to transmit the job data to the application server 12. Here, examples of the job data include document data and the image data stored in the application server 12. Upon receiving the instruction to transmit the job data given by the user, the application server 12 starts a process of transmitting the job data to the image processing device 4 in the local environment 2 based on the instruction. However, the application server 12 is installed in a network environment different from the local network 6 and unable to detect an IP address or the like of the image processing device 4 serving as a transmission destination of the job data. In addition, since the firewall is installed in the local environment 2, the application server 12 is unable to transmit the job data directly to the image processing device 4. In this regard, the transmission of the job data is performed through the first communication process illustrated in FIG. 2.

As illustrated in FIG. 2, when the communication relay function is enabled (process P1), the communication relay device 3 first establishes the connection state with the platform server 13 (process P2). As a result, the communication relay device 3 and the platform server 13 enter a constantly connected state, and a state in which data communication from the platform server 13 to the communication relay device 3 installed in the local environment 2 while passing through the firewall can be performed is made. Thereafter, when a job to be transmitted to the image processing device 4 is generated in the application server 12 (process P3), the application server 12 transmits a connection request to the platform server 13 (process P4). The connection request includes information specifying one image processing device 4 serving as the transmission destination of the job data. The image processing device 4 installed in the local environment 2 and the communication relay device 3 that relays the communication of the image processing device 4 are associated with each other and registered in the platform server 13. Upon receiving the connection request from the application server 12, the platform server 13 specifies the image processing device 4 serving as the transmission destination of the job data based on the connection request, and further specifies the communication relay device 3 that relays the communication of the specified image processing device 4. Then, the platform server 13 transmits a connection command to the specified communication relay device 3 (process P5). The connection command includes information specifying the application server 12.

Upon receiving the connection command from the platform server 13, the communication relay device 3 specifies the application server 12 to be connected, and establishes the connection state with the application server 12 (process P6). Accordingly, the application server 12 enters the state in which data can be transmitted to the communication relay device 3 of the local environment 2 through the firewall. Then, the application server 12 transmits the job data to the communication relay device 3 in response to the establishment of the connection state with the communication relay device 3 (process P7). Upon receiving the job data from the application server 12, the communication relay device 3 specifies the port number or the like based on the relay information that is generated in advance, and transfers the job data to the image processing device 4 designated by the application server 12 using the port number (process P8). Then, upon receiving the job data from the communication relay device 3, the image processing device 4 executes the print job or the like based on the job data. Through the first communication process, the job data is normally transmitted from the application server 12 to the image processing device 4.

Figure 3:
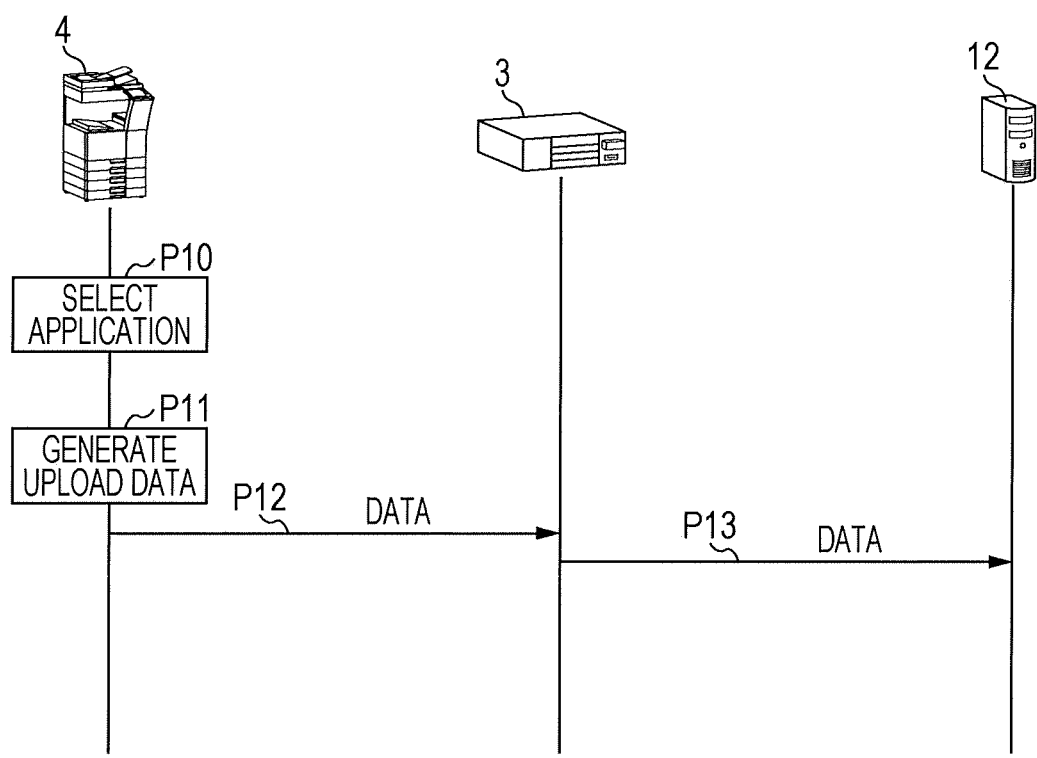
FIG. 3 is a diagram illustrating a second communication process performed such that a communication relay device relays communication between an image processing device and an application server.

FIG. 3 is a diagram illustrating a second communication process performed such that the communication relay device 3 relays the communication between the image processing device 4 and the application server 12. The second communication process is also a common communication process when the exchange of the communication relay device 3 is excluded, and an example in which upload data is transmitted from the image processing device 4 to the application server 12 is described. For example, when the application server 12 is registered in the image processing device 4 in advance, applications provided by the application server 12 are displayed on the operation panel 5 in a selectable state. When the user selects an application provided by the application server 12 by operating the operation panel 5 (process P10), the image processing device 4 executes a job in collaboration with the application server 12, and generates data to be uploaded to the application server 12 (process P11). For example, the upload data may be data generated by scanning an original through the scan job or may be data generated by reading data stored in a predetermined storage region such as BOX. Then, when the upload data is generated, the image processing device 4 transmits the upload data to the communication relay device 3 (process P12). Upon receiving the upload data from the image processing device 4, the communication relay device 3 specifies the URL of the application server 12, the port number, or the like based on the relay information that is generated in advance, and transmits the upload data to the application server 12 designated from the image processing device 4 (process P13). Then, the application server 12 performs, for example, a process of storing the upload data received from the communication relay device 3, and provides the application service. Through the second communication process, data is normally transmitted from the image processing device 4 to the application server 12.

In the information processing system 1 having the above configuration, when the normal operation is performed in a state in which the common communication process can be performed, the communication relay device 3 generates an exchange key configured with a character string including a predetermined number or more of characters at a predetermined timing or regularly, transmits the exchange key to the license server 10, and transmits the exchange key to the image processing device 4 connected to the local network 6. Upon receiving the exchange key from the communication relay device 3, the license server 10 manages the exchange key such that the exchange key is associated with the identification information of the communication relay device 3. Upon receiving the exchange key from the communication relay device 3, the image processing device 4 may store the exchange key.

When the communication relay device 3 is exchanged due to a failure or the like, the recording medium 9 mounted in the communication relay device 3 before the exchange is removed, and the recording medium 9 is mounted in a communication relay device 3 that is newly installed in the local environment 2 as described above. In other words, when the new communication relay device 3 is initially activated in the state connected to the local network 6, a plurality of recording media 9a and 9b are simultaneously mounted. At the time of activation with the supply of electric power, when a plurality of recording media 9a and 9b are mounted, the communication relay device 3 performs an exchange sequence different from that at the time of normal activation. With the start of the exchange sequence, the communication relay device 3 requests the image processing device 4 connected to the local network 6 to transmit the exchange key transmitted from the communication relay device 3 before the exchange, and acquires the exchange key from the image processing device 4. Then, the communication relay device 3 transmits the exchange key acquired from the image processing device 4 to the license server 10, and gives a notification indicating an exchanged new device.

Upon receiving the exchange key from the communication relay device 3, the license server 10 determines whether or not the communication relay device 3 is exchanged. Then, when the communication relay device 3 is determined to be exchanged, the license server 10 performs a process of restoring the relay information generated by the communication relay device 3 before the exchange in the exchanged new communication relay device 3 from the backup server 11. Thus, the exchanged new communication relay device 3 need not generate the relay information again from the beginning and can take over the relay information used by the communication relay device 3 before the exchange and effectively start the normal operation. Configuration and operations of the communication relay device 3 and the license server 10 will be described below in detail.

Figure 4:
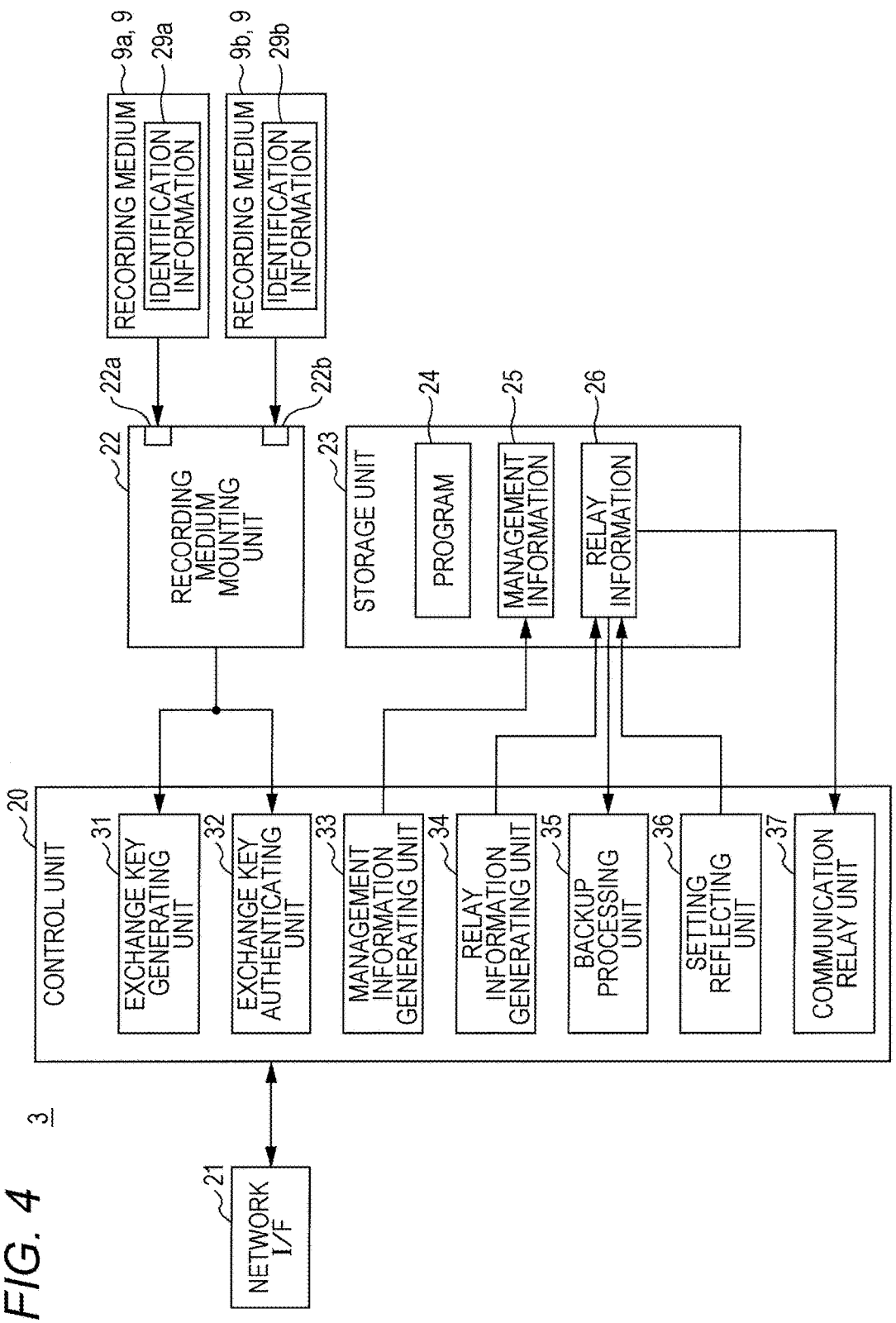
FIG. 4 is a block diagram illustrating an example of a hardware configuration and a functional configuration of a communication relay device.

FIG. 4 is a block diagram illustrating an example of a hardware configuration and a functional configuration of the communication relay device 3. The communication relay device 3 includes a control unit 20, a network interface 21, a recording medium mounting unit 22, and a storage unit 23. The control unit 20 is configured with a CPU and a memory, and controls operations of the respective units. The network interface 21 is an interface that connects the communication relay device 3 with the local network 6. The communication relay device 3 performs communication with the image processing device 4 or various kinds of servers through the network interface 21. The recording medium mounting unit 22 is an interface for mounting the recording medium 9 and includes a plurality of slots 22a and 22b into which a plurality of recording media 9a and 9b are mounted. Different identification information 29a and 29b is stored in a plurality of recording media 9a and 9b in advance. The storage unit 23 is configured with, for example, a semiconductor memory, a magnetic storage device, or the like, and stores a program 24, management information 25, and relay information 26.

The CPU included in the control unit 20 reads and executes the program 24 stored in the storage unit 23 with the supply of electric power to the communication relay device 3. As a result, the control unit 20 functions as an exchange key generating unit 31, an exchange key authenticating unit 32, a management information generating unit 33, a relay information generating unit 34, a backup processing unit 35, a setting reflecting unit 36, and a communication relay unit 37. When execution of the program 24 starts, the control unit 20 determines whether or not the number of recording media 9 mounted in the recording medium mounting unit 22 is 1 or 2, and when only one recording medium 9 is mounted, the control unit 20 causes the exchange key generating unit 31 to function. On the other hand, when two recording media 9 are mounted, the control unit 20 causes the exchange key authenticating unit 32 to function. In other words, the exchange key generating unit 31 and the exchange key authenticating unit 32 are processing units that selectively function according to the number of recording media 9 mounted in the recording medium mounting unit 22.

First, an operation when the communication relay device 3 is activated in the state in which one recording medium 9a is mounted in the recording medium mounting unit 22 will be described. When the exchange key generating unit 31 functions at the time of activation of the communication relay device 3, the exchange key generating unit 31 first reads the identification information 29a from one recording medium 9a mounted in the recording medium mounting unit 22, and transmits the identification information 29a to the license server 10 through the network interface 21. Thus, the authentication process by the license server 10 is performed. Upon receiving the enable signal from the license server 10 after the identification information 29a is transmitted, the exchange key generating unit 31 causes the management information generating unit 33, the relay information generating unit 34, the backup processing unit 35, and the communication relay unit 37 to effectively function. However, when the enable signal is not received from the license server 10, the exchange key generating unit 31 causes the management information generating unit 33, the relay information generating unit 34, the backup processing unit 35, and the communication relay unit 37 not to function.

Further, upon receiving the enable signal from the license server 10, the exchange key generating unit 31 generates the exchange key at a predetermined timing or regularly. For example, the exchange key generating unit 31 generates the exchange key by generating a character string including a predetermined number or more of characters randomly using a random number generation algorithm or the like.

When the exchange key is generated, the exchange key generating unit 31 encrypts the exchange key using a predetermined encryption key. In this case, a key used to decrypt the exchange key in the license server 10 is used as the encryption key. For example, the exchange key generating unit 31 reads the identification information 29a from the recording medium 9a mounted in the recording medium mounting unit 22, and encrypts the exchange key by performing an encryption process based on a predetermined encryption algorithm using the encryption key corresponding to the identification information 29a. The identification information 29a may be used for the encryption key.

When the exchange key is encrypted, the exchange key generating unit 31 transmits the encrypted exchange key to the license server 10. At this time, the exchange key generating unit 31 transmits the identification information 29a read from the recording medium 9a to the license server 10 together with the exchange key. Thus, the exchange key is managed in the license server 10 in the state associated with the identification information 29a.

The exchange key generating unit 31 also transmits the encrypted exchange key to the image processing device 4 connected to the local network 6. At this time, the exchange key is transmitted to the image processing device 4 together with the identification information 29a. Thus, the exchange key is stored in the image processing device 4 in the state associated with the identification information 29a.

When a plurality of image processing devices 4a and 4b are installed in the local network 6, the exchange key generating unit 31 may transmit the exchange key to all a plurality of image processing devices 4a and 4b. Further, the exchange key generating unit 31 may select at least one device serving as an exchange key storage target among a plurality of image processing devices 4a and 4b and transmit the exchange key to the selected target. In this case, the exchange key generating unit 31 selects at least one device among a plurality of image processing devices 4a and 4b in descending order of operation rates. Thus, it is possible to prevent the image processing device 4 storing the exchange key from entering a dormant state when a work of exchanging the communication relay device 3 is performed. However, when it is difficult to acquire the operation rates of a plurality of image processing devices 4a and 4b, a device having a FAX function may be preferentially selected as an exchange key storage target. It is because most of the image processing devices 4 having the FAX function are in a constant operation state.

The management information generating unit 33 is a processing unit that searches for the image processing device 4 connected to the local network 6, specifies the image processing device 4 serving as the relay target device, and registers the specified image processing device 4 in the management information 25. FIG. 5 is a diagram illustrating an example of the management information 25. For example, the IP address or a media access control (MAC) address of the image processing device 4 are registered in the management information 25 as illustrated in FIG. 5. When there is another communication relay device 3 in the local network 6, the management information generating unit 33 acquires the management information 25 from another communication relay device 3, specifies the image processing device 4 not overlapping another communication relay device 3 as the relay target device, and registers the specified image processing device 4 in the management information 25 thereof. Further, the management information generating unit 33 performing the process of searching for the image processing device 4 regularly and appropriately updates the management information 25. When new information is registered in the management information 25, the management information generating unit 33 transmits the management information 25 to the platform server 13. Thus, the platform server 13 can specify the communication relay device 3 that relays the communication of the image processing device 4 installed in the local environment 2.

The relay information generating unit 34 is a processing unit that generates the relay information 26 for relaying the communication between the image processing device 4 and the application server 12 and stores the relay information 26 in the storage unit 23. FIG. 6 is a diagram illustrating an example of the relay information 26. The relay information 26 includes server side connection information and LAN side connection information. The server side connection information includes, for example, the URL of the application server 12 and the port number used when communication with the application server 12 is performed. The LAN side connection information includes, for example, the port number used when communication with the image processing device 4 is performed. For example, when first communication with the application server 12 not registered in the relay information 26 is performed, the relay information generating unit 34 generates a pair of server side connection information and LAN side connection information, and registers the server side connection information and the LAN side connection information in the relay information 26. For example, when the application server 12 is registered in the image processing device 4, registration information related to an application is transmitted from the application server 12 to the image processing device 4 through the communication relay device 3. At this time, the relay information generating unit 34 generates a pair of server side connection information and LAN side connection information and registers the server side connection information and the LAN side connection information in the relay information 26 in the associated state.

The backup processing unit 35 transmits the relay information 26 stored in the storage unit 23 to the backup server 11 at a predetermined timing, and performs a backup process. A timing at which the backup processing unit 35 transmits the relay information 26 to the backup server 11 is a timing at which a predetermined period of time elapses after previous transmission or a timing at which the relay information 26 of the storage unit 23 is updated. The backup processing unit 35 transmits the relay information 26 to the backup server 11 so that the same information as the relay information 26 stored in the storage unit 23 is held in the backup server 11.

The communication relay unit 37 is a processing unit that relays the communication between the image processing device 4 and the application server 12. When the communication relay unit 37 starts to effectively function, first, the communication relay unit 37 establishes the connection state with the platform server 13, and enters the state in which a command is constantly receivable form the platform server 13. Thereafter, when the command is received from the platform server 13 or when the command is received from the image processing device 4, the communication relay unit 37 relays the communication between the image processing device 4 and the application server 12 based on the relay information 26 stored in the storage unit 23. For example, when the connection command to be given from the platform server 13 to the application server 12 is received, the communication relay unit 37 establishes the connection state with the application server 12. Then, when data to be transmitted from the application server 12 to the image processing device 4 is received, the communication relay unit 37 transfers data to the image processing device 4 based on the relay information 26 using the port number of the LAN side connection information associated with the application server 12 serving as a transmission source of data. At this time, the communication relay unit 37 performs address translation with reference to the management information 25, and transfers data to the image processing device 4 designated by the application server 12.

When the communication relay unit 37 transfers data transmitted from a specific application server 12 to the image processing device 4 using a specific port number, the communication relay unit 37 can receive data to be transmitted from the image processing device 4 to a specific application server 12 using a specific port number. Thus, upon receiving data from the image processing device 4, the communication relay unit 37 can specify the application server 12 serving as a transfer destination of the data based on the port number through which the data is received with reference to the relay information 26 and transmit the data to the specific application server 12.

Further, when communication is initially performed with a new application server 12 not registered in the relay information 26, the communication relay unit 37 newly allocates a port number for performing communication with the image processing device 4, and notifies the relay information generating unit 34 of the port number, and thus information related to the new application server 12 is registered in the relay information 26.

However, when a communication protocol with the application server 12 and a communication protocol with the image processing device 4 are different, for example, protocol conversion information for performing protocol conversion may be registered in the relay information 26, in addition to the information illustrated in FIG. 6. In this case, the communication relay unit 37 performs the protocol conversion based on the protocol conversion information which is registered in the relay information 26 in advance, and transfers data.

Next, an operation when the communication relay device 3 is activated in the state in which the two recording media 9a and 9b are mounted in the recording medium mounting unit 22 will be described. The exchange key authenticating unit 32 searches for the image processing device 4 connected to the local network 6, and requests all the image processing devices 4 which are determined to be in the operation state by the search to transmit the exchange key transmitted by the communication relay device 3 before the exchange. At this time, the exchange key authenticating unit 32 reads the identification information 29a of the communication relay device 3 before the exchange from one recording medium 9a, and transmits the exchange key request including the identification information 29a attached thereto. Thus, even when a plurality of exchange keys are held in the image processing device 4, it is possible to specify one exchange key corresponding to the communication relay device 3 before the exchange. However, when it is unclear which of the two recording media 9a and 9b is a recording medium mounted in the communication relay device 3 before the exchange, the exchange key authenticating unit 32 preferably transmits the exchange key request including the two pieces of identification information 29a and 29b read from the two recording media 9a and 9b, respectively.

When the exchange key transmitted from the communication relay device 3 before the exchange is stored, the image processing device 4 transmits the exchange key to the communication relay device 3 upon receiving the exchange key request from the exchanged communication relay device 3. Thus, the exchanged communication relay device 3 can acquire the encrypted exchange key which is issued by the communication relay device 3 before the exchange from the local network 6 connected to the exchanged communication relay device 3.

When the exchange key is acquired from the image processing device 4, the exchange key authenticating unit 32 transmits the exchange key to the license server 10. At this time, the exchange key authenticating unit 32 transmits the identification information 29a and 29b read from the two recording media 9a and 9b, respectively to the license server 10 together with the exchange key acquired from the image processing device 4. Accordingly, the license server 10 can detect that the exchange sequence is performed in the communication relay device 3 and perform the authentication process for the exchange key. When the exchange key received from the exchanged communication relay device 3 is authenticated to be an appropriate exchange key issued by the communication relay device 3 before the exchange, the license server 10 performs the process of restoring the relay information 26 stored in the backup server 11 in the exchanged new communication relay device 3. In other words, the license server 10 transmits a command to restore the relay information 26 to the backup server 11, and transmits the connection command to establish a connection with the backup server 11 to the communication relay device 3. However, since the connection command transmitted from the license server 10 to the communication relay device 3 is transmitted as a response signal associated with the reception of the identification information 29a and 29b and the exchange key, the connection command can be normally transmitted from the license server 10 to the communication relay device 3.

After the exchange key is transmitted to the license server 10, the exchange key authenticating unit 32 causes the setting reflecting unit 36 to function upon receiving the connection command to establish a connection with the backup server 11 from the license server 10.

The setting reflecting unit 36 establishes a connection with the backup server 11 based on the connection command transmitted from the license server 10, and downloads and acquires the relay information 26 stored in the communication relay device 3 before the exchange from the backup server 11. Then, the setting reflecting unit 36 restores the relay information 26 acquired from the backup server 11 in the storage unit 23, and automatically reflects the relay information 26 used by the communication relay device 3 before the exchange in its own device. When the process of reflecting the relay information 26 ends, the setting reflecting unit 36 notifies the worker of a setting end by turning on an LED (not illustrated) with a predetermined light emission pattern or outputting an alarm through a speaker (not illustrated). Then, the worker removes the recording medium 9a corresponding to the communication relay device 3 before the exchange, and thus the exchange sequence ends, and the communication relay device 3 returns to the normal operation state. Thereafter, the communication relay unit 37 enters the state in which it is possible to relay the communication between the image processing device 4 and the application server 12 using the relay information 26 restored in the storage unit 23.

Figures 7, 8:
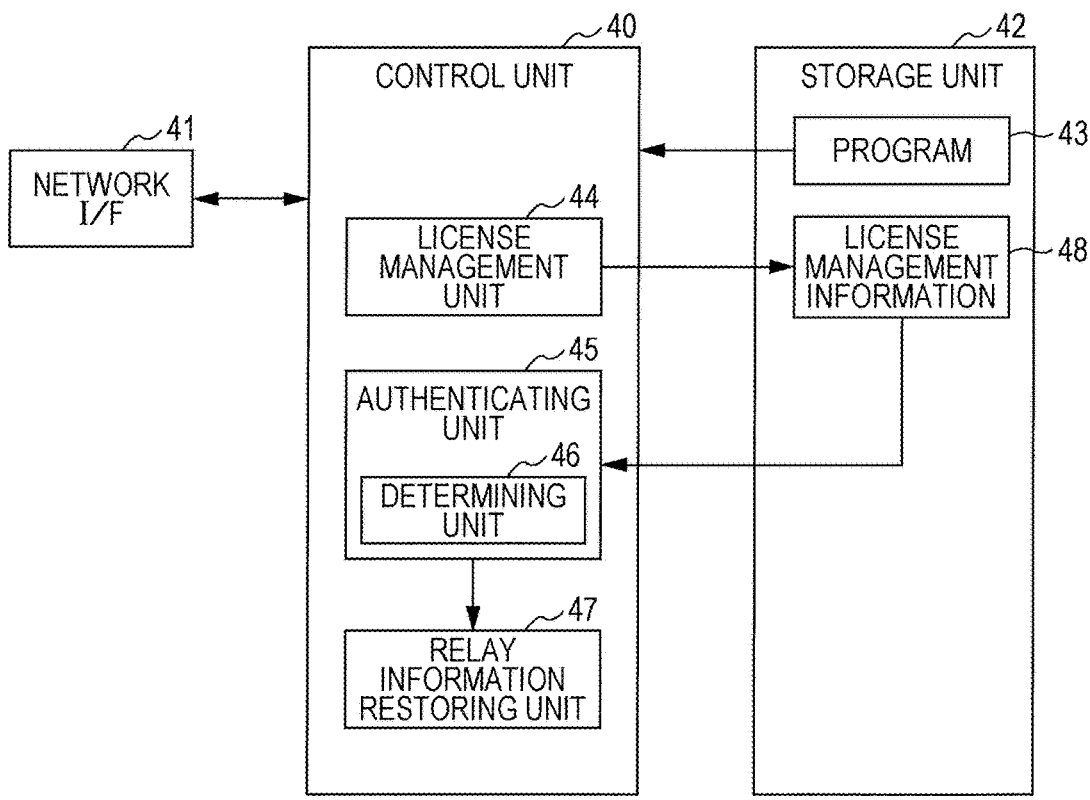
FIG. 7 is a block diagram illustrating an example of a hardware configuration and a functional configuration of a license server.
FIG. 8 is a diagram illustrating an example of license management information.

FIG. 7 is a block diagram illustrating an example of a hardware configuration and a functional configuration of the license server 10. The license server 10 includes a control unit 40, a network interface 41, and a storage unit 42. The control unit 40 is configured with a CPU and a memory, and controls operations of the respective units. The network interface 41 is an interface for connecting the license server 10 to the Internet. The license server 10 performs communication with the communication relay device 3 or the backup server 11 through the network interface 41. The storage unit 42 is configured with, for example, a semiconductor memory, a magnetic storage device, or the like, and stores a program 43 and license management information 48.

The CPU included in the control unit 40 reads and executes the program 43 stored in the storage unit 42 with the supply of electric power to the license server 10. As a result, the control unit 40 functions as a license management unit 44, an authenticating unit 45, and a relay information restoring unit 47.

The license management unit 44 generates the license management information 48 used for managing the license of the communication relay device 3 installed in the local environment 2, stores the license management information 48 in the storage unit 42, and manages the license management information 48. FIG. 8 is a diagram illustrating an example of the license management information 48. The license management information 48 is information in which the identification information 29a and 29b recorded in the recording media 9a and 9b mounted in the communication relay device 3 is registered in advance, that is, information that enables the exchange key to be registered in association with the identification information 29a and 29b. FIG. 8 illustrates an example in which two pieces of identification information are registered, and the exchange key is already registered in each of the two pieces of identification information. For example, when an administrator who manages the license of the communication relay device 3 issues new identification information, the license management unit 44 registers the identification information in the license management information 48. At this time, the exchange key is not registered, and only the new identification information is registered in the license management information 48.

Further, when the exchange key is received from the communication relay device 3, the license management unit 44 registers the exchange key in the license management information 48. For example, when one piece of identification information and the exchange key are received from the communication relay device 3, the license management unit 44 determines that the exchange key is newly registered or updated under the condition that the identification information is registered in the license management information 48. When the exchange key is newly registered or updated, the license management unit 44 specifies a decryption key for the encrypted exchange key based on the identification information received together with the exchange key, and decrypts the exchange key using the decryption key. Then, the license management unit 44 registers the decrypted exchange key in the license management information 48 to be associated with the identification information.

The authenticating unit 45 is a processing unit that authenticates the identification information and the exchange key received from the communication relay device 3. When only one piece of identification information is received from the communication relay device 3, the authenticating unit 45 performs the authentication process by determining whether or not the received identification information is registered in the license management information 48. In other words, when the identification information received from the communication relay device 3 is registered in the license management information 48, the authenticating unit 45 determines the license to be valid, and transmits the enable signal to the communication relay device 3. On the other hand, when the identification information received from the communication relay device 3 is not registered in the license management information 48, the authenticating unit 45 does not transmit the enable signal. In this case, the communication relay unit 37 of the communication relay device 3 does not function.

Further, when the two pieces of identification information 29a and 29b and the exchange key are received from the communication relay device 3, the authenticating unit 45 includes a determining unit 46 that determines whether or not the communication relay device 3 is exchanged. The determining unit 46 performs the process of authenticating the exchange key under the condition that both of the two pieces of identification information 29a and 29b received from the communication relay device 3 are registered in the license management information 48. In other words, when the exchange key and the two pieces of identification information 29a and 29b are received from the communication relay device 3, the determining unit 46 determines that the communication relay device 3 is exchanged when the same exchange key as the exchange key received from the communication relay device 3 is already registered in the license management information 48 in the state associated with any one of the two pieces of identification information 29a and 29b. However, the exchange key received from the communication relay device 3 is in the encrypted state. For this reason, the determining unit 46 decrypts the encrypted exchange key received from the communication relay device 3 and then authenticates the exchange key. Specifically, when the exchange key and the two pieces of identification information 29a and 29b are received from the communication relay device 3 that is newly installed by the exchange, both of the two pieces of identification information 29a and 29b are likely to be registered in the license management information 48. Further, the exchange key transmitted from the communication relay device 3 before the exchange is likely to be already registered in one of the two pieces of identification information 29a and 29b. For this reason, when the exchange key and the two pieces of identification information 29a and 29b are received from the communication relay device 3, the determining unit 46 first determines whether or not the two pieces of identification information 29a and 29b and the exchange key are registered in the license management information 48 in the state in which the exchange key is associated with one of the two pieces of identification information 29a and 29b received from the communication relay device 3. As a result, when the two pieces of identification information 29a and 29b and the exchange key are registered in the state in which the exchange key is associated with none of the two pieces of identification information 29a and 29b or when the two pieces of identification information 29a and 29b and the exchange key are registered in the state in which the exchange key is already associated with both of the two pieces of identification information 29a and 29b, the determining unit 46 determines that the exchange work is not performed. On the other hand, when the two pieces of identification information 29a and 29b and the exchange key are registered in the state in which the exchange key is associated with only one of the two pieces of identification information 29a and 29b, the determining unit 46 determines that the exchange work is performed. Then, when the exchange work is determined to be performed, the determining unit 46 decrypts the exchange key received from the communication relay device 3 using the decryption key corresponding to one piece of identification information associated with the exchange key. Then, the determining unit 46 determines whether or not the decrypted exchange key is identical to the exchange key registered in the license management information to be associated with one piece of identification information, and determines the exchange work to be properly performed when the decrypted exchange key is identical to the exchange key registered in the license management information to be associated with one piece of identification information. The, when the exchange work is determined to be properly performed, the determining unit 46 causes the relay information restoring unit 47 to function.

The relay information restoring unit 47 performs control such that the relay information 26 stored in the backup server 11 by the communication relay device 3 before the exchange is restored for the exchanged communication relay device 3. The relay information restoring unit 47 causes the relay information 26 stored in the backup server 11 to be transmitted form the backup server 11 to the exchanged communication relay device 3, for example, by transmitting a restoration command to the backup server 11. However, the backup server 11 is unable to transmit the relay information 26 directly to the communication relay device 3. For this reason, the relay information restoring unit 47 transmits the connection command to establish a connection with the backup server 11 to the communication relay device 3. The communication relay device 3 establishes the connection state with the backup server 11 based on the connection command. Thus, the backup server 11 can transmit the relay information 26 to the communication relay device 3. For this reason, when the connection state with the communication relay device 3 is established, the backup server 11 reads the relay information 26 stored as backup by the communication relay device 3 before the exchange, and transmits the relay information 26 to the exchanged communication relay device 3.

Figure 9:
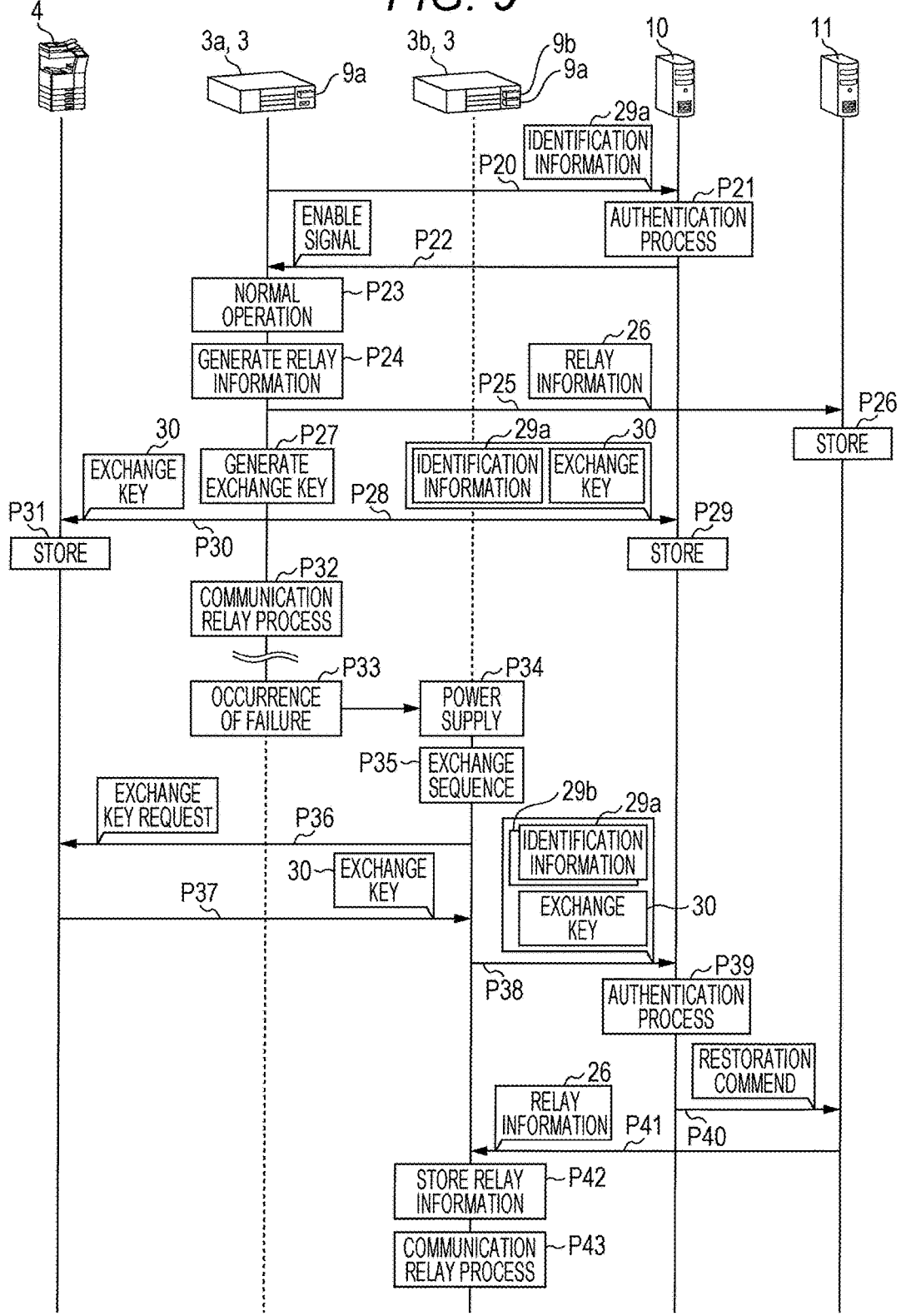
FIG. 9 is a diagram illustrating an example of a restoration process of restoring relay information of a communication relay device before exchange in an exchanged communication relay device in an information processing system.

FIG. 9 is a diagram illustrating an example of the restoration process of restoring the relay information 26 of the communication relay device 3a before the exchange in the exchanged communication relay device 3b in the information processing system 1 having the above configuration. First, at the time of activation with the supply of electric power, the communication relay device 3a transmits the identification information 29a to the license server 10 (process P20). Upon receiving the identification information 29a from the communication relay device 3a, the license server 10 performs the authentication process (process P21), and when there is the identification information 29a registered in the license management information 48, the license server 10 transmits the enable signal to the communication relay device 3a (process P22). The communication relay device 3a causes the communication relay unit 37 to perform the normal operation based on the enable signal (process P23). Thus, the communication relay device 3a establishes the constant connection state with the platform server 13, and relays the communication between the application server 12 and the image processing device 4.

Then, as the communication with the application server 12 is performed, the communication relay device 3a generates the relay information 26 (process P24), and transmits the relay information 26 to the backup server 11 (process P25). Then, the backup server 11 stores the relay information 26 received from the communication relay device 3a as backup (process P26).

Further, when the relay information 26 is transmitted to the backup server 11, the communication relay device 3a generates an exchange key 30 (process P27). Then, the communication relay device 3a transmits the exchange key 30 to the license server 10 together with the identification information 29a (process P28). Thus, the license server 10 stores the exchange key 30 by registering the exchange key 30 and the identification information 29a in the license management information 48 in the associated state (process P29). Further, when the exchange key 30 is transmitted to the license server 10, the communication relay device 3a also transmits the same exchange key 30 to the image processing device 4 (process P30). However, at this time, it is desirable that the exchange key 30 be transmitted together with the identification information 29a. Then, the image processing device 4 stores the exchange key 30 transmitted from the communication relay device 3a (process P31). Then, the communication relay device 3a continuously performs a communication relay process of relaying the communication between the application server 12 and the image processing device 4 (process P32).

Thereafter, when a failure or the like occurs in the communication relay device 3a (process P33), the communication relay device 3a is removed from the local network 6 and exchanged with another new communication relay device 3b (process P34). At this time, the recording medium 9 amounted in the communication relay device 3a before the exchange is mounted in the exchanged communication relay device 3b. Thus, electric power is supplied to the communication relay device 3b that is newly installed by the exchange in the state in which the two recording media 9a and 9b are mounted. As a result, at the time of activation with the supply of electric power, the communication relay device 3b starts the exchange sequence (process P35).

When the exchange sequence starts, the communication relay device 3b requests the image processing device 4 to transmit the exchange key (process P36), and acquires the exchange key 30 issued by the communication relay device 3a before the exchange from the image processing device 4 (process P37). Then, the communication relay device 3b transmits the exchange key 30 acquired from the image processing device 4 and the two pieces of identification information 29a and 29b read from the two recording media 9a and 9b to the license server 10 (process P38). Upon receiving the two pieces of identification information 29a and 29b and the exchange key 30 from the communication relay device 3*b*, the license server 10 performs the authentication process for the exchange key 30 (process P39), and when an appropriate exchange work is determined to be performed, the license server 10 transmits the connection command to establish a connection with the backup server 11 to the communication relay device 3*b*, and transmits the restoration command to the backup server 11 (process P40).

Upon receiving the connection command from the license server 10, the communication relay device 3*b* establishes a connection with the backup server 11, and acquires the relay information 26 which is stored as backup by the communication relay device 3*a* before the exchange from the backup server 11 (process P41). The communication relay device 3*b* stores the relay information 26 in the storage unit 23, and reflects the relay information 26 used by the communication relay device 3*a* before the exchange in the communication relay device 3*b* without change (process P42). Thereafter, the communication relay device 3*b* returns to the normal operation, and starts the process of relaying the communication between the application server 12 and the image processing device 4 using the relay information 26 stored in the storage unit 23 (process P43).

In the information processing system 1, the restoration process is performed, and thus the communication relay device 3*b* which is installed by the exchange in the local environment 2 can automatically acquire the relay information 26 stored in the backup server 11 by the communication relay device 3*a* before the exchange at the time of initial activation and reflect the relay information 26 in the communication relay device 3*b*. Thus, there are effects in that the exchanged communication relay device 3*b* need not generate the relay information 26 again from the beginning and can rapidly start the process of relaying the communication between the application server 12 and the image processing device 4 using the relay information 26 used by the communication relay device 3*a* before the exchange and reduce a period of time required for the recovery work associated with the exchange.

In the above-described restoration process, when the communication relay device 3 (3*a* and 3*b*) is exchanged, the administrator who manages the servers including the license server 10 need not perform any work. Thus, since the communication relay device 3 can be exchanged through an independent work in the local environment 2, there is an effect in that, when a failure occurs in the communication relay device 3, the exchange work can be performed any time 24 hours.

Further, the communication relay device 3 is configured to sequentially update the exchange key when the normal operation is performed. Thus, even when the exchange key stored in the image processing device 4 is illegally stolen, the exchange key is unusable after a predetermined period of time elapses. Accordingly, the exchange key is unlikely to be illegally used, and a high-security system is implemented. Further, when the exchange key is transmitted to the image processing device 4 or the license server 10, the communication relay device 3 encrypts and transmits the exchange key, and thus the security of the system is further improved.

Figure 10:
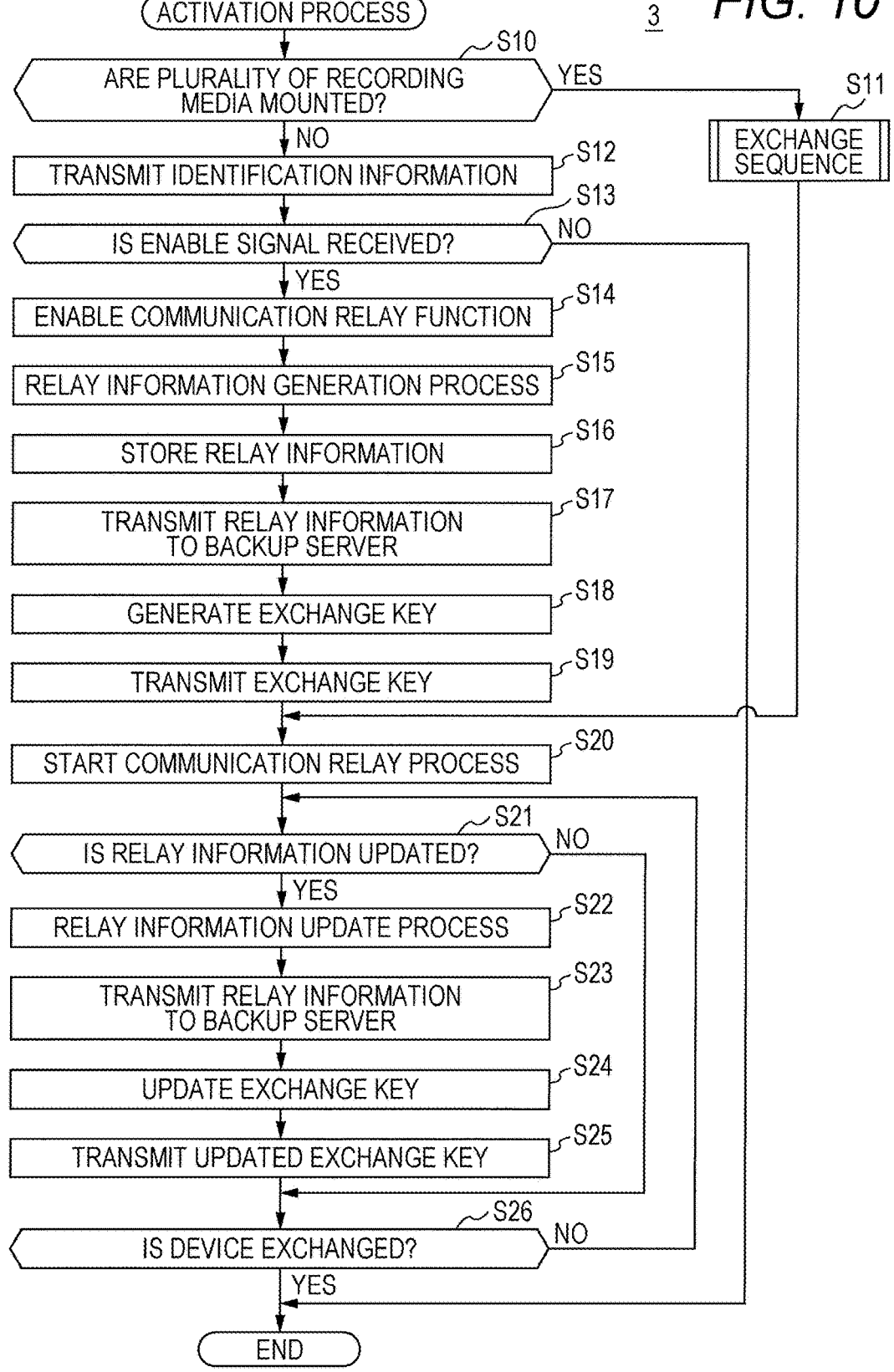
FIG. 10 is a flowchart illustrating an example of a process performed in a communication relay device.
Figure 11:
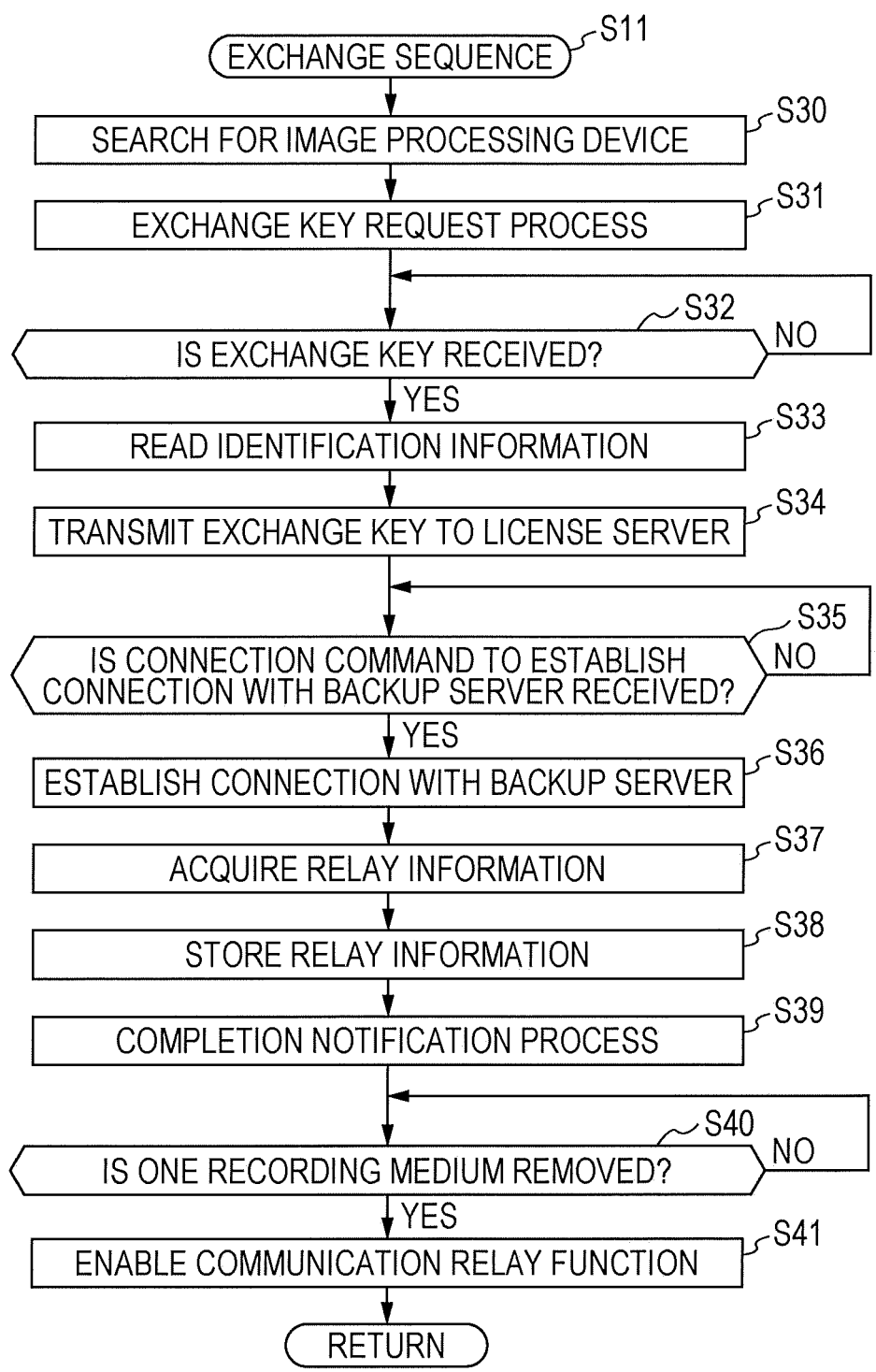
FIG. 11 is a flowchart illustrating an example of a detailed process of an exchange sequence.

Next, FIGS. 10 and 11 are flowcharts illustrating an example of a process performed in the communication relay device 3. When the activation process starts with the supply of electric power, the communication relay device 3 first determines whether or not a plurality of recording media 9*a* and 9*b* are mounted in the recording medium mounting unit 22 (step S10). When a plurality of recording media 9*a* and 9*b* are mounted (YES in step S10), the communication relay device 3 determines that the exchange sequence start condition is satisfied, and executes the exchange sequence (step S11). The exchange sequence will be described later in detail. On the other hand, when only one recording medium 9 is mounted in the recording medium mounting unit 22 (NO in step S10), the communication relay device 3 reads the identification information from one recording medium 9, and transmits the identification information to the license server 10 (step S12). Thereafter, the communication relay device 3 determines whether or not the enable signal is received from the license server 10 (step S13), and when the enable signal is received (YES in step S13), the communication relay function is enabled (step S14). However, when the enable signal is not received from the license server 10 (NO in step S13), the communication relay function does not operate.

When the communication relay function is enabled, the communication relay device 3 establishes the constant connection state with the platform server 13, causes the relay information generating unit 34 to function, and performs a relay information generation process (step S15), and stores the relay information 26 in the storage unit 23 (step S16). Then, the communication relay device 3 transmits the relay information 26 stored in the storage unit 23 to the backup server 11 to be stored as backup (step S17). Thus, the communication relay device 3 generates the exchange key (step S18), encrypts the exchange key, and transmits the exchange key to the license server 10 and the image processing device 4 (step S19). Thereafter, the communication relay device 3 starts the process of relaying the communication between the application server 12 and the image processing device 4 (step S20). At this time, the communication relay device 3 performs the communication relay process based on the relay information 26 stored in the storage unit 23.

Thereafter, when it is necessary to update the relay information 26, for example, when communication with a new application server 12 is performed, the communication relay device 3 determines that the relay information 26 is updated (YES in step S21), and performs a relay information update process (step S22). In the relay information update process, the relay information generating unit 34 functions, and information used for performing communication with a new application server 12 is additionally registered in the relay information 26. Then, when the relay information 26 is updated, the communication relay device 3 transmits the updated relay information 26 to the backup server 11 (step S23). Accordingly, the relay information 26 held as backup in the backup server 11 is constantly updated to the latest state. Further, when the relay information 26 is updated, the communication relay device 3 newly generates and updates the exchange key (step S24), encrypts the updated new exchange key, and transmits the encrypted exchange key to the license server 10 and the image processing device 4 (step S25). Accordingly, the exchange keys stored in the license server 10 and the image processing device 4 are updated to the new exchange key.

The communication relay device 3 performs the process of steps S21 to S25 until it is exchanged with another device due to a failure or the like (NO in step S26). On the other hand, when the communication relay device 3 is exchanged with another device due to a failure or the like (YES in step S26), the communication relay device 3 is powered off, and execution of all the processes ends.

FIG. 11 is a flowchart illustrating an example of a detailed process of the exchange sequence (step S11). When the exchange sequence starts, the communication relay device 3 first searches for the image processing device 4 connected to the local network 6 (step S30). Then, the process of requesting the image processing device 4 determined to be in the operation state by the search to transmit the exchange key is performed (step S31). At this time, the communication relay device 3 reads the identification information 29a of the communication relay device 3 before the exchange in the two recording media 9a and 9b, and transmits the exchange key request including the identification information 29a attached thereto. Thereafter, upon receiving the exchange key from the image processing device 4 (YES in step S32), the communication relay device 3 reads the two pieces of identification information 29a and 29b from the two recording media 9a and 9b (step S33), and transmits the exchange key acquired from the image processing device 4 to the license server 10 together with the two pieces of identification information 29a and 29b (step S34).

Thereafter, the communication relay device 3 is on standby until the connection command to establish a connection with the backup server 11 is received from the license server 10 (NO in step S35), and when the connection command is received (YES in step S35), the communication relay device 3 establishes a connection with the backup server 11 based on the connection command (step S36). Then, the communication relay device 3 acquires the relay information 26 from the backup server 11 (step S37), and stores the relay information 26 in the storage unit 23 (step S38). When the restoration of the relay information 26 is completed, the communication relay device 3 performs the completion notification process of giving a notification to the worker, for example, turns on an LED (step S39). Then, the communication relay device 3 checks that one recording medium 9 (the recording medium 9 corresponding to the communication relay device 3 before the exchange) is removed (YES in step S40), then enables the communication relay function (step S41), and ends the exchange sequence.

When the exchange sequence ends, the communication relay device 3 performs the process of step S20 and subsequent steps in FIG. 10, and starts the process of relaying the communication between the application server 12 and the image processing device 4. At this time, the communication relay device 3 performs the communication relay process based on the relay information 26 downloaded and acquired from the backup server 11.

Next, FIG. 12 is a flowchart illustrating an example of a process performed in the license server 10. This process is repeatedly performed in the license server 10. The license server 10 first determines whether or not one piece of identification information is solely received (step S50). When one piece of identification information is solely received (YES in step S50), the license server 10 performs the authentication process of determining whether or not the identification information is registered in the license management information 48 (step S51). Then, when the received identification information is registered in the license management information 48 in the valid state (step S52), the license server 10 transmits the enable signal to the communication relay device 3 (step S53). However, when one piece of identification information is not solely received (NO in step S50), the process of steps S51 to S53 is not performed.

Next, the license server 10 determines whether or not one piece of identification information and the exchange key are received (step S54). When one piece of identification information and the exchange key are received (YES in step S54), the license server 10 decrypts the exchange key using the decryption key corresponding to the received identification information (step S55), and registers the decrypted exchange key in the license management information 48 (step S56). However, when one piece of identification information and the exchange key are not received (NO in step S54), the process of steps S55 to S56 is not performed.

Next, the license server 10 determines whether or not a plurality of pieces of identification information and the exchange key are simultaneously received (step S57). When a plurality of pieces of identification information and the exchange key are simultaneously received (YES in step S57), the license server 10 determines whether or not a plurality of pieces of identification information are registered in the license management information 48 (step S58), and when a plurality of pieces of identification information are registered (YES in step S58), the license server 10 determines whether or not the exchange key is registered in any one of a plurality of pieces of identification information (step S59). As a result, when the exchange key is registered in any one of a plurality of pieces of identification information (YES in step S59), the license server 10 specifies the decryption key based one piece of identification information in which the exchange key is registered, and decrypts the received encrypted exchange key using the decryption key (step S60). Then, the license server 10 determines whether or not the decrypted exchange key is identical to the exchange key registered in the license management information 48 (step S61), and when the decrypted exchange key is identical to the exchange key registered in the license management information 48 (step S62), an appropriate exchange work is determined to be performed. Then, the license server 10 transmits the restoration command to the backup server 11 (step S62), and transmits the connection command to establish a connection with the backup server 11 to the communication relay device 3 (step S63). Thus, the relay information 26 used by the communication relay device 3 before the exchange is restored for the communication relay device 3 newly installation by the exchange in the local environment 2. However, when a plurality of pieces of identification information and the exchange key are not simultaneously received (NO in step S57), when a plurality of pieces of identification information are not registered in the license management information 48 (NO in step S58), or when the exchange key is not registered in any one of a plurality of pieces of identification information (NO in step S59), the process of step S60 and subsequent steps is not performed. Further, when the decrypted exchange key is not identical to the exchange key registered in the license management information 48 (NO in step S61), the process of step S62 and subsequent steps is not performed.

As described above, in the present embodiment, the communication relay device 3 is configured to generate the exchange key including a random character string and transmit the exchange key to the image processing device 4 in the local environment 2 and the license server 10 in the cloud 7 in advance when the communication relay device 3 performs the normal operation in the local environment 2. Then, when the communication relay device 3 is exchanged due to a failure or the like, and the communication relay device 3 is newly installed in the local environment 2, the new communication relay device 3 acquires the exchange key transmitted by the communication relay device 3 before the exchange from the image processing device 4 in the same local environment 2, and transmits the exchange key to the license server 10. Then, when the exchange key is received from the new communication relay device 3, the license server 10 determines whether or not an appropriate exchange work is performed by determining whether or not the exchange key is identical to the exchange key generated by the communication relay device 3 before the exchange, and when an appropriate exchange work is performed, the license server 10 restores the relay information 26 stored in the backup server 11 for the new communication relay device 3.

According to the above-described configuration, even when the communication relay device 3 of the local environment 2 is exchanged, it is possible to rapidly reflect the relay information 26 before the exchange in the exchanged communication relay device 3, and it is possible to reduce a period of time in which it is difficult to perform the communication between the application server 12 and the image processing device 4 as much as possible. Further, when the relay information 26 is restored for the exchanged communication relay device 3, a manual work is not performed, and thus the exchange work can be effectively finished. In other words, in the information processing system 1 of the present embodiment, it is possible to perform the processes from the license authentication to the restoration of the relay information 26 stored in the backup server 11 in the exchanged communication relay device 3 automatically and collectively when the communication relay device 3 is exchanged, and it is possible to use the exchanged communication relay device 3 in a short period of time. Further, in the information processing system 1 of the present embodiment, when the exchange work of the communication relay device 3 is performed in the local environment 2, it is not necessary to perform a special work in the server installation environment such as the license server 10, and thus it is possible to perform the exchange work in the local environment 2 at any time, and thus the convenience is high.

Further, in the information processing system 1 of the present embodiment, the exchange key is newly generated and updated each time the relay information 26 is updated in the state in which the communication relay device 3 performs the normal operation or regularly at predetermined time intervals. At this time, the exchange keys held in the image processing device 4 and the license server 10 are also simultaneously updated. Thus, even when the exchange key is illegally stolen, it is possible to reduce a possibility that the exchange key will be illegally used, and the high-security system can be constructed accordingly.

MODIFIED EXAMPLE

The exemplary embodiment of the present invention has been described above, but the present invention is not limited to the example described in the above embodiment, and various modified examples can be applied.

For example, in the above embodiment, the license server 10, the backup server 11, the application server 12, and the platform server 13 are installed in the cloud 7 on the Internet, but the present invention is not limited thereto. In other words, the servers need not be necessarily installed in the cloud 7 on the Internet as long as the servers are installed in a network different from the local network 6 to which the communication relay device 3 and the image processing device 4 are connected.

In the above embodiment, the communication relay device 3 is exchanged with a new device when a failure or the like occurs in the communication relay device 3, but the communication relay device 3 may be exchanged due to other reasons than a failure. For example, when a new model of the communication relay device 3 is released, the communication relay device 3 may be exchanged with a new model although no failure occurs in the communication relay device 3 of the local environment 2. In this case, when the technique described above in the above embodiment is employed, it is possible to the relay information 26 before the exchange in the exchanged communication relay device 3 rapidly.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A communication relay device that relays communication performed between an image processing device and an application server via a network, comprising:
    an exchange key generating unit that generates an exchange key, and transmits the exchange key to the image processing device and a license server connected to the network;
    a relay information generating unit that generates relay information used for relaying the communication between the image processing device and the application server;
    a storage unit that stores the relay information generated by the relay information generating unit;
    a communication relay unit that relays the communication between the image processing device and the application server based on the relay information stored in the storage unit;
    a backup unit that transmits the relay information stored in the storage unit to a backup server connected to the network at a predetermined timing;
    an exchange key authenticating unit that determines whether or not an exchange sequence start condition is satisfied, and, when the exchange sequence start condition is satisfied, acquires the exchange key from the image processing device and transmits the exchange key to the license server;
    a setting reflecting unit that, after the exchange key authenticating unit transmits the exchange key, acquires the relay information from the backup server based on an instruction given from the license server, and stores the relay information in the storage unit; and
    wherein the exchange key generating unit, the relay information generating unit, the storage unit, the communication relay unit, the backup unit, the exchange key authenticating unit and the setting reflecting unit comprising at least one hardware processor.

2. The communication relay device according to claim 1, wherein, when a plurality of image processing devices are connected to the network, the exchange key generating unit selects at least one image processing device among the plurality of image processing devices, and transmits the exchange key to the at least one image processing device.

3. The communication relay device according to claim 2, wherein the exchange key generating unit analyzes operation rates of the plurality of image processing devices, and selects the at least one image processing device as a transmission target of the exchange key in descending order of the operation rates.

4. The communication relay device according to claim 1, wherein, when the exchange key is transmitted to the image processing device and the license server, the exchange key generating unit encrypts the exchange key using a predetermined encryption key, and transmits the encrypted exchange key.

5. The communication relay device according to claim 1, further comprising a recording medium mounting unit in which a plurality of recording media are mountable, wherein, when one recording medium is mounted in the recording medium mounting unit, the exchange key generating unit generates the exchange key, and transmits identification information recorded in the one recording medium to the license server together with the exchange key.

6. The communication relay device according to claim 5, wherein, when a plurality of recording media are mounted in the recording medium mounting unit, the exchange key authenticating unit determines the exchange sequence start condition to be satisfied, acquires the exchange key from the image processing device, reads a plurality of pieces of identification information from the plurality of recording media mounted in the recording medium mounting unit, and transmits the exchange key acquired from the image processing device and the plurality of pieces of identification information read from the plurality of recording media to the license server.

7. The communication relay device according to claim 6, wherein, when the exchange key is transmitted to the image processing device and the license server, the exchange key generating unit encrypts the exchange key using an encryption key corresponding to the identification information read from the one recording medium, and transmits the encrypted exchange key.

8. The communication relay device according to claim 1, wherein the exchange key generating unit updates the exchange key at a predetermined timing, and transmits the updated exchange key to the image processing device and the license server each time the exchange key is updated.

9. The communication relay device according to claim 8, wherein the backup unit transmits the relay information to the backup server at a timing at which the relay information is updated by the relay information generating unit, and the exchange key generating unit updates the exchange key at a timing at which the relay information is transmitted to the backup server.

10. An information processing system, comprising:
the communication relay device according to claim 1;
an image processing device connected to a network;
an application server that provides an application service in collaboration with the image processing device via the network;
a license server that is connected to the network and manages the communication relay device; and
a backup server that stores information received via the network as backup,
wherein the communication relay device is a communication relay device that relays communication between the image processing device and the application server via the network, and
the license server includes
a license management unit that registers the exchange key transmitted from the communication relay device in license management information, and manages the exchange key,
a determining unit that determines that the communication relay device is exchanged if the exchange key is already registered in the license management information when the exchange key is received from the communication relay device, and a relay information restoring unit that causes the communication relay device to acquire the relay information stored in the backup server and store the relay information in the storage unit when the determining unit determines that the communication relay device is exchanged.

11. The information processing system according to claim 10,
wherein, when a plurality of image processing devices are connected to the network, the exchange key generating unit selects at least one image processing device among the plurality of image processing devices, and transmits the exchange key to the at least one image processing device.

12. The information processing system according to claim 11,
wherein the exchange key generating unit analyzes operation rates of the plurality of image processing devices, and selects the at least one image processing device as a transmission target of the exchange key in descending order of the operation rates.

13. The information processing system according to claim 10,
wherein, when the exchange key is transmitted to the image processing device and the license server, the exchange key generating unit encrypts the exchange key using a predetermined encryption key, and transmits the encrypted exchange key, and
when the encrypted exchange key is received from the communication relay device, the license server decrypts the exchange key using a decryption key constituting a pair with the encryption key.

14. The information processing system according to claim 10,
wherein the communication relay device further includes a recording medium mounting unit in which a plurality of recording media are mountable,
when one recording medium is mounted in the recording medium mounting unit, the exchange key generating unit generates the exchange key, and transmits identification information recorded in the one recording medium to the license server together with the exchange key, and
the license management unit registers the exchange key and the identification information transmitted from the communication relay device in the license management information to be associated with each other, and manages the exchange key and the identification information.

15. The information processing system according to claim 14,
wherein, when a plurality of recording media are mounted in the recording medium mounting unit, the exchange key authenticating unit determines the exchange sequence start condition to be satisfied, acquires the exchange key from the image processing device, reads a plurality of pieces of identification information from the plurality of recording media mounted in the recording medium mounting unit, and transmits the exchange key acquired from the image processing device and the plurality of pieces of identification information read from the plurality of recording media to the license server, and
when the exchange key and the plurality of pieces of identification information are received from the communication relay device, the determining unit determines that the communication relay device is exchanged when the exchange key and the plurality of pieces of identification information are already registered in the license management information in a state in which the exchange key received from the communication relay device is associated with any one of the plurality of pieces of identification information.

16. The information processing system according to claim 15,
wherein, when the exchange key is transmitted to the image processing device and the license server, the exchange key generating unit encrypts the exchange key using an encryption key corresponding to the identification information read from the one recording medium, and transmits the encrypted exchange key, and
when the exchange key and the plurality of pieces of identification information are received from the communication relay device, if the exchange key and the plurality of pieces of identification information are already registered in the license management information in a state in which the exchange key received from the communication relay device is associated with any one of the plurality of pieces of identification information, the determining unit decrypts the exchange key received from the communication relay device using a decryption key corresponding to the one piece of identification information, and determines whether or not the decrypted exchange key is identical to the exchange key registered in the license management information to be associated with the one piece of identification information.

17. The information processing system according to claim 10,
wherein the exchange key generating unit updates the exchange key at a predetermined timing, and transmits the updated exchange key to the image processing device and the license server each time the exchange key is updated.

18. The information processing system according to claim 17,
wherein the backup unit transmits the relay information to the backup server at a timing at which the relay information is updated by the relay information generating unit, and
the exchange key generating unit updates the exchange key at a timing at which the relay information is transmitted to the backup server.

19. A license server that manages a communication relay device in an information processing system including an image processing device connected to a network, an application server that provides an application service in collaboration with the image processing device via the network, the communication relay device that relays communication between the image processing device and the application server via the network, and a backup server that stores relay information transmitted from the communication relay device via the network as backup, the license server comprising:
a license management unit that registers the exchange key transmitted from the communication relay device in license management information, and manages the exchange key;
a determining unit that determines that the communication relay device is exchanged if the exchange key is already registered in the license management information when the exchange key is received from the communication relay device;
a relay information restoring unit that causes the communication relay device to acquire the relay information stored in the backup server and restore the relay information in the communication relay device when the determining unit determines that the communication relay device is exchanged; and
wherein the license management unit, the determining unit and the relay information restoring unit comprising at least one hardware processor.

20. The license server according to claim 19,
wherein, when the exchange key encrypted using a predetermined encryption key is received from the communication relay device, the exchange key is decrypted using a decryption key constituting a pair with the encryption key.

21. The license server according to claim 19,
wherein, when one piece of identification information is received from the communication relay device together with the exchange key, the license management unit registers the exchange key and the one piece of identification information in the license management information to be associated with each other, and manages the exchange key and the one piece of identification information.

22. The license server according to claim 21,
when the exchange key and a plurality of pieces of identification information are received from the communication relay device, the determining unit determines that the communication relay device is exchanged when the exchange key and the plurality of pieces of identification information are already registered in the license management information in a state in which the exchange key received from the communication relay device is associated with any one of the plurality of pieces of identification information.

23. The license server according to claim 22,
wherein, when the encrypted exchange key and the plurality of pieces of identification information are received from the communication relay device, if the exchange key and the plurality of pieces of identification information are already registered in the license management information in a state in which the exchange key received from the communication relay device is associated with any one of the plurality of pieces of identification information, the determining unit decrypts the exchange key received from the communication relay device using a decryption key corresponding to the one piece of identification information, and determines whether or not the decrypted exchange key is identical to the exchange key registered in the license management information to be associated with the one piece of identification information.

24. A non-transitory recording medium storing a computer readable program executed in a communication relay device that relays communication between an image processing device and an application server via a network, the program causing the communication relay device to execute:
a first step of generating an exchange key and transmitting the exchange key to the image processing device and a license server connected to the network;
a second step of generating relay information used for relaying communication between the image processing device and the application server;
a third step of storing the relay information generated in the second step in a predetermined storage unit;

a fourth step of relaying the communication between the image processing device and the application server based on the relay information stored in the storage unit;

a fifth step of transmitting the relay information stored in the storage unit to a backup server connected to the network at a predetermined timing;

a sixth step of determining whether or not an exchange sequence start condition is satisfied, and acquiring the exchange key from the image processing device and transmitting the exchange key to the license server when the exchange sequence start condition is satisfied; and a seventh step of acquiring, after the exchange key is transmitted in the sixth step, the relay information from the backup server based on an instruction given from the license server and storing the relay information in the storage unit.

25. A non-transitory recording medium storing a computer readable program executed in a license server that manages a communication relay device in an information processing system including an image processing device connected to a network, an application server that provides an application service in collaboration with the image processing device via the network, the communication relay device that relays communication between the image processing device and the application server via the network, and a backup server that stores relay information transmitted from the communication relay device via the network as backup, the program causing the license server to execute:

a first step of registering an exchange key transmitted from the communication relay device in license management information and managing the exchange key;

a second step of determining that the communication relay device is exchanged if the exchange key is already registered in the license management information when the exchange key is received from the communication relay device; and a third step of causing the communication relay device to acquire the relay information stored in the backup server and restore the relay information in the communication relay device when the communication relay device is determined to be exchanged in the second step.

26. A data recovery method when a communication relay device is exchanged in an information processing system including an image processing device connected to a network, an application server that provides an application service in collaboration with the image processing device via the network, the communication relay device that relays communication between the image processing device and the application server via the network, a license server that is connected to the network and manages the communication relay device, and a backup server that stores information received via the network as backup, the data recovery method comprising:

a first step of generating, by the communication relay device, an exchange key and transmitting the exchange key to the image processing device and the license server;

a second step of registering, by the license server, the exchange key transmitted from the communication relay device in license management information, and managing the exchange key;

a third step of generating, by the communication relay device, relay information used for relaying the communication between the image processing device and the application server;

a fourth step of storing, by the communication relay device, to store the relay information in a predetermined storage unit;

a fifth step of relaying, by the communication relay device, the communication between the image processing device and the application server based on the relay information stored in the storage unit;

a sixth step of transmitting, by the communication relay device, the relay information stored in the storage unit to the backup server at a predetermined timing;

a seventh step of determining whether or not an exchange sequence start condition is satisfied in the communication relay device after the communication relay device is exchanged, and acquiring, by the communication relay device, the exchange key from the image processing device and transmitting the exchange key to the license server when the exchange sequence start condition is satisfied;

an eighth step of determining, by the license server, that the communication relay device is exchanged if the exchange key is already registered in the license management information when the exchange key is received from the communication relay device;

a ninth step of causing, by the license server, the communication relay device to acquire the relay information stored in the backup server when the communication relay device is determined to be exchanged in the eighth step; and a tenth step of acquiring, by the communication relay device, the relay information from the backup server based on an instruction given from the license server and storing the relay information in the storage unit.

27. The communication relay device according to claim 1, wherein an exchange sequence start condition is satisfied when it is determined that the communication relay device is a replacement relay device.

* * * * *